United States Patent
Lam

(10) Patent No.: US 8,085,486 B2
(45) Date of Patent: *Dec. 27, 2011

(54) METHOD FOR INTERFACING NON-VOLATILE MEDIUM CONTROL SYSTEM COMPONENTS

(75) Inventor: Yat-tung Lam, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/842,687

(22) Filed: Jul. 23, 2010

(65) Prior Publication Data

US 2010/0290146 A1    Nov. 18, 2010

Related U.S. Application Data

(63) Continuation of application No. 11/749,261, filed on May 16, 2007, now Pat. No. 7,764,453.

(60) Provisional application No. 60/800,888, filed on May 16, 2006.

(51) Int. Cl.
*G11B 5/09* (2006.01)

(52) U.S. Cl. .................. 360/39; 360/46; 360/48; 360/51

(58) Field of Classification Search ........................ None
See application file for complete search history.

(56) References Cited

U.S. PATENT DOCUMENTS

| 5,455,721 | A | 10/1995 | Nemazie et al. | |
|---|---|---|---|---|
| 6,519,104 | B1 | 2/2003 | Cloke et al. | |
| 6,526,530 | B1 | 2/2003 | Nazari et al. | |
| 6,594,096 | B2 | 7/2003 | Burns et al. | |
| 6,594,098 | B1 | 7/2003 | Sutardja | |
| 6,691,186 | B2 * | 2/2004 | Thomson et al. | 710/58 |
| 6,871,251 | B1 | 3/2005 | Azimi | |
| 6,961,197 | B1 | 11/2005 | Burd et al. | |
| 7,080,188 | B2 | 7/2006 | Byers et al. | |
| 7,088,534 | B2 | 8/2006 | Sutardja | |
| 7,199,954 | B2 | 4/2007 | Lee et al. | |
| 7,281,065 | B1 | 10/2007 | Lam et al. | |
| 7,525,747 | B2 * | 4/2009 | Sai et al. | 360/46 |
| 2004/0201913 | A1 | 10/2004 | Sutardja | |

* cited by examiner

*Primary Examiner* — Jason Olson

(57) ABSTRACT

In a method for causing data to be written to a non-volatile medium, first data to be encoded and written in a sector of the non-volatile medium as a codeword is transmitted to a write or read/write channel device, and a write gate signal corresponding to the sector is asserted. Asserting the write gate signal indicates to the write or read/write channel device when to write the codeword to the sector. While asserting the write gate signal to cause the codeword to be written, second data to be encoded and written to the non-volatile medium is transmitted to the write or read/write channel device.

23 Claims, 14 Drawing Sheets

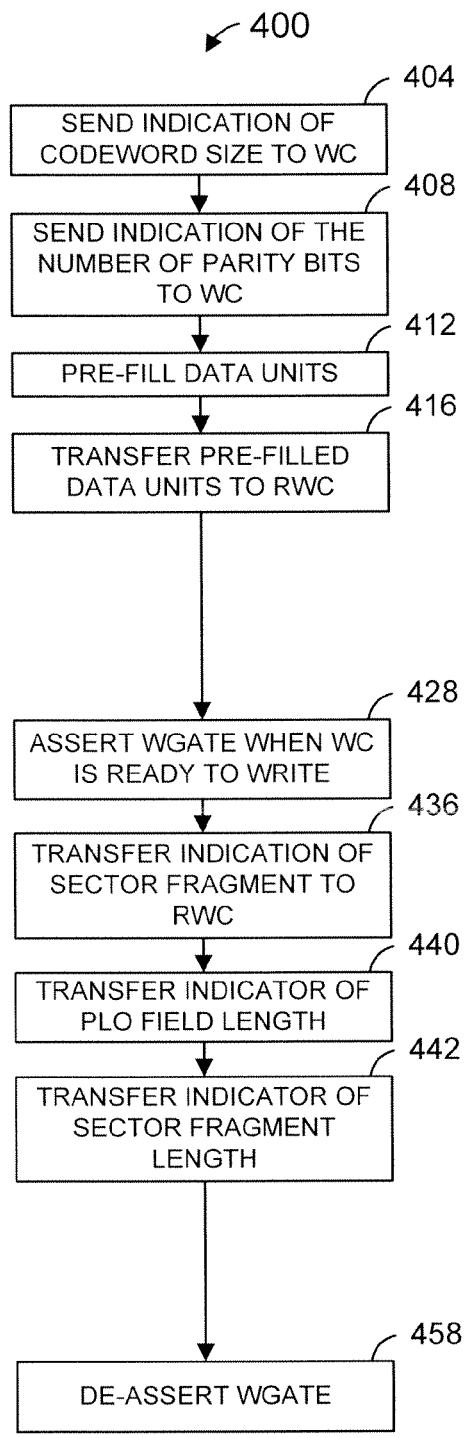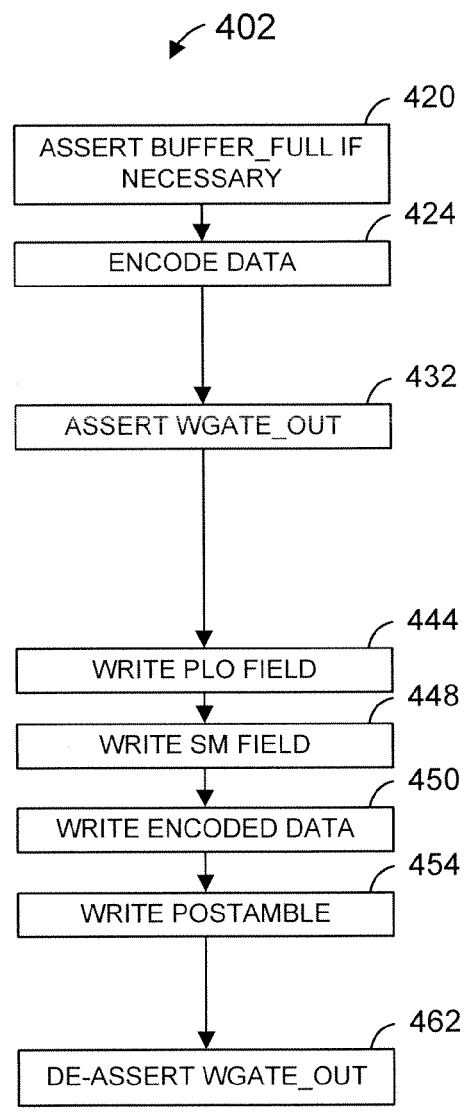
FIG. 6A
FIG. 6B

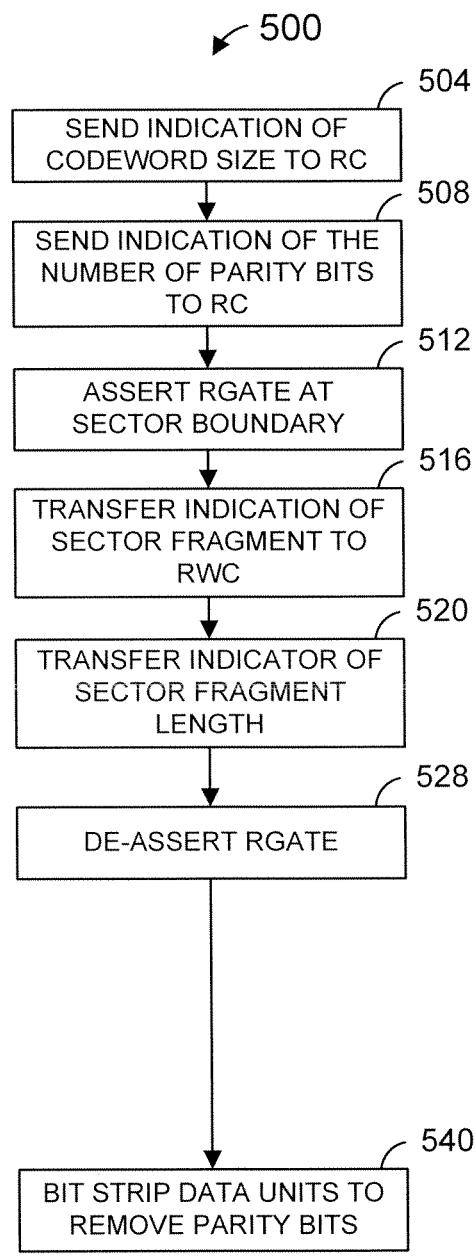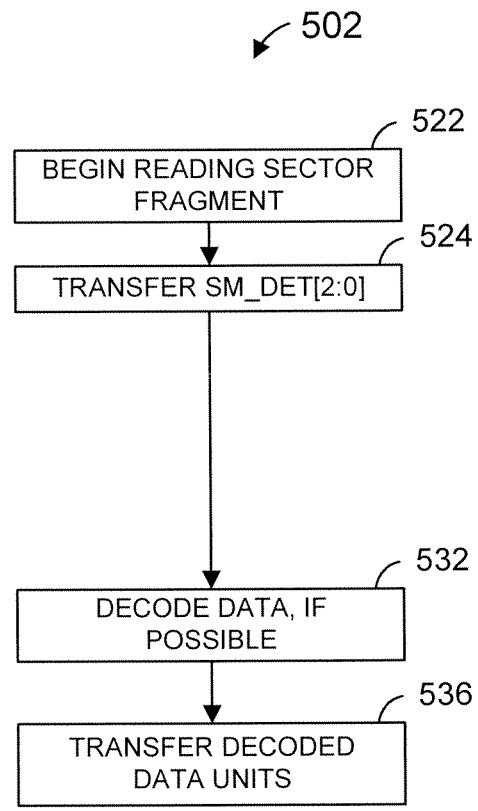
*FIG. 9A*        *FIG. 9B*

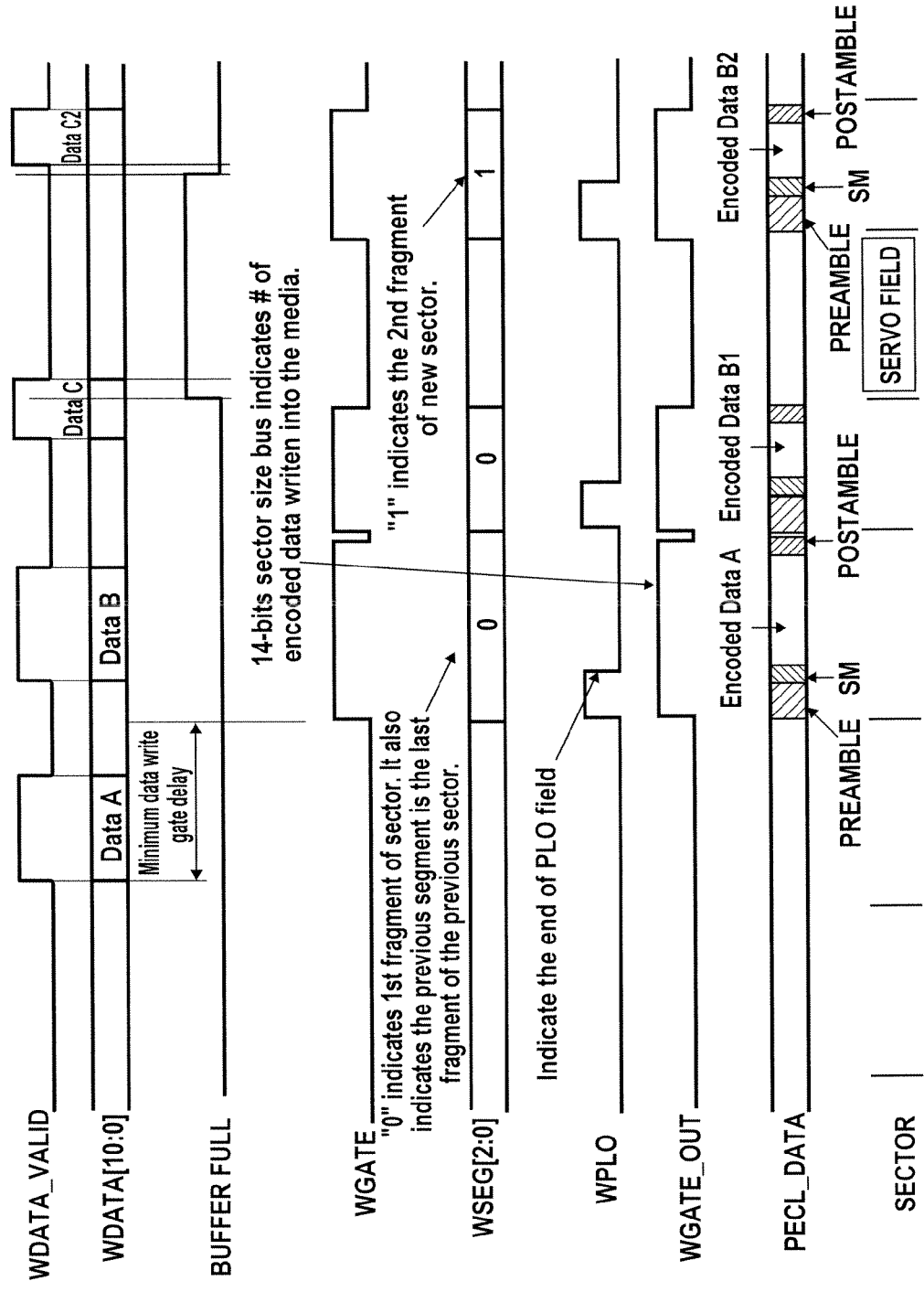

METHOD FOR INTERFACING NON-VOLATILE MEDIUM CONTROL SYSTEM COMPONENTS

CROSS-REFERENCE TO RELATED APPLICATION

The present application is a continuation of U.S. patent application Ser. No. 11/749,261, filed on May 16, 2007, and entitled "Method for Interfacing Non-Volatile Medium Control System Components," which claims the benefit of U.S. Provisional Application No. 60/800,888, entitled "Long Latency Protocol," filed on May 16, 2006. Both of the above-mentioned patent applications are hereby incorporated by reference herein in their entireties.

FIELD OF TECHNOLOGY

The present disclosure relates generally to non-volatile medium storage devices and, more particularly, to interfaces between a non-volatile medium controller and a read channel device, a write channel device, or a read/write channel device.

DESCRIPTION OF THE RELATED ART

FIG. 1 is a block diagram of an example prior art magnetic disk drive system 100 having a head-disk assembly 104 and a hard disk control system 108. The hard-disk assembly 104 includes one or more magnetic disks 112 and one or more corresponding magnetic heads 116 on a moving arm 120. The moving arm 120 may be coupled to a servo 124 that may be used to position the magnetic heads 116 over the magnetic disks 112. The hard disk control system 108 includes an interface 128 that receives data to be written to the one or more magnetic disks 112 and transmits data read from the one or more magnetic disks 112. The interface 128 may be communicatively coupled to a microprocessor of a computing system such as a server, a personal computer, a personal digital assistant (PDA), etc., or of a consumer electronics device such as a cellular phone, a set top box, a gaming system, etc., to allow the microprocessor to store data to and read data from the one or more magnetic disks 112. The interface 128 may be coupled to a hard disk controller (HDC) 132. The HDC 132 is in turn coupled to a read/write channel device (RWC) 136 and a servo controller 140. The RWC 136 is coupled to the magnetic heads 116 and the servo controller 140 is coupled to the servo 124.

Data to be written to the disks 112 are received via the interface 128. The HDC 132 transmits signals to the servo controller 140 to cause the magnetic heads 116 to be positioned such that data will be written to an appropriate track on one of disks 112. Additionally, the HDC 132 will provide the data to be written to the RWC 136. The RWC 136 generates an analog write signal and provides it to the appropriate magnetic head 116 such that the data is magnetically stored on the disk 112 at the appropriate position.

When data is to be read from one of the disks 112, the microprocessor of the computing device or consumer electronics device provides a request to the interface 128, indicating the data to be read. The interface 128 provides the indication to the HDC 132. Then, the HDC 132 transmits signals to the servo controller 140 to cause the magnetic heads 116 to be positioned over the appropriate track on the disks 112. Additionally, the HDC 132 indicates to the RWC 136 from which of the disks 112 (if there are multiple disks) to read and when to begin reading so that data from an appropriate portion on the disk 112 will be read. In response, at the appropriate time, the RWC 136 generates a digital signal from an analog signal received from the magnetic head 116. This digital signal is provided to the HDC 132. The HDC provides the retrieved data to the interface 128, which in turn provides it to the requesting microprocessor.

FIG. 2 is an illustration of an example magnetic media disk 150 that may be utilized in the disk drive system 100 of FIG. 1. The disk 150 includes a plurality of servo field areas 154 that generally radiate outwardly from the center of the disk 150. Additionally, the disk 150 is generally partitioned into a plurality of concentric regions referred to as tracks 158. A servo field area 154 within a particular track 158 may be referred to as a servo field. Each servo field may include data which is pre-written on the disk 150 during manufacturing, and such data may include data concerning the location of the servo field on the disk 150, such as the particular servo field area to which it corresponds and the track in which it is located. As can be seen in FIG. 2, each track 158 will include several servo fields. The servo field data may be used by the hard disk system to position the magnetic head 116 during read and write operations. Thus, the servo field data should not be overwritten by the hard disk system 100. As a result, the hard disk system 100 should be capable of determining where the servo fields are located and preventing the writing of data within the servo fields.

Data to be stored is written in the tracks 158 between the servo fields. Additionally, the data to be stored on a track 158 is organized as sectors, and typically there are multiple sectors per track 158. An example of a typical format of a sector 174 is illustrated in FIG. 3. The sector 174 includes a field having a known pattern (PLO field) 182 that is used to synchronize a phase-locked loop of the RWC 136 to the signal stream corresponding to the sector 174. The sector 174 also includes a sync mark (SM) field 184 that may be used by the RWC 136 to identify and/or synchronize to the beginning of a data field 186 that follows the SM field 184. The sector 174 may also include a postamble field 188 that follows the data field 186 and indicates the end of the data field 186.

Typically, in order to provide for robustness against partial erasure of magnetic transitions, the data to be stored on the disks is first encoded by the RWC 136. In other words, the data in the data field 186 may be encoded. FIG. 4A is an illustration of a typical process implemented by the RWC 136 during a write operation. Data to be stored is organized as bytes, noted as D0, D1, . . . , D255. The RWC 136 first produces encoded data units D0', D1', . . . , D255' according to an encoding process 192. For example, each byte D0, D1, . . . , D255 may be encoded by adding one parity bit to produce a digital signal of 9-bit encoded data units D0', D1', . . . , D255'. The parity bit can be chosen to guarantee that the total number of 1's in the codeword of m bits is even, for example. If during write and read processes, an error occurs in one bit, the parity sum will be odd as an indication that there is an error somewhere among the block of m bits. Optionally, more parity bits can be added to each byte. In the RWC 136, as each byte to be stored is received, a corresponding encoded data unit is generated. Then, the RWC 136 performs a conversion process 194 whereby the encoded digital signal is converted to an analog signal, which is then provided to the appropriate magnetic head 116. A WRITE GATE signal indicates to the RWC 136 when to begin generating the analog signal. The WRITE GATE signal may be provided by the HDC 132. As each data byte is received by the RWC 136, the corresponding encoded data unit is generated. The latency between when the first data byte is received and when the encoded data is ready for digital-to-analog conversion is relatively short and predictable.

FIG. 4B is an illustration of a typical process implemented by the RWC 136 during a read operation. A READ GATE signal indicates to the RWC 136 when to begin converting the analog signal from the magnetic head 116 into a digital signal. The READ GATE signal may be provided by the HDC 132. Then, the analog signal is converted into a digital signal according to a conversion process 196. The resulting digital signal will correspond to the encoded data signal having 9-bit encoded data units D0', D1', . . . , D255'. Then, the RWC 136 decodes the encoded data into the bytes D0, D1, . . . , D255 according to a decode process 198. As each encoded data unit is received, the corresponding decoded byte is generated. The latency between when the READ GATE signal is asserted and when the read channel begins to generate the decoded data bytes D0, D1, . . . , D255 is relatively short and predictable. For example, some disk drive systems have latencies of about 20 bytes which, depending on the particular system, may amount to a time delay of between about 800 ns and 5 ms.

SUMMARY OF THE DISCLOSURE

In one embodiment, a method for causing data to be written to a non volatile medium includes transmitting, to a write or read/write channel device, first data to be encoded and written in a sector of the non-volatile medium as a codeword, and asserting a write gate signal corresponding to the sector, wherein asserting the write gate signal indicates to the write or read/write channel device when to write the codeword to the sector. The method additionally includes, while asserting the write gate signal to cause the codeword to be written, transmitting, to the write or read/write channel device, second data to be encoded and written to the non-volatile medium.

In another embodiment, a non-volatile medium controller to control a write or read/write channel device comprises a write data bus generation circuit, the write data bus to transmit data units corresponding to a first codeword to be written in a write sector, wherein the write sector is a sector of a non volatile medium to which the first codeword is to be written. The non-volatile medium controller also comprises a write gate signal generation circuit configured to generate a write gate signal, the write gate signal, when asserted, indicating when the first codeword is to be written to the write sector. The non-volatile medium controller is configured to cause the write data bus generation circuit to transmit, on the write data bus, data units corresponding to a second codeword while the write gate signal is asserted for writing the first codeword to the write sector.

In yet another embodiment, a method for causing data to be written to a non volatile medium includes receiving first data to be encoded and written in a sector of the non volatile medium as a codeword, and encoding the first data to generate the codeword. Additionally, the method includes, if the sector is a split sector, asserting a non volatile medium write signal to write a portion of the first codeword to a fragment of the sector. Also, the method includes, if the sector is not a split sector, asserting the non volatile medium write signal to write the first codeword to the sector.

In still a another embodiment, a write or read/write channel device comprises a write data bus reception circuit to receive first data units via a write data bus, and an encoder to generate a first codeword based on the first data units received via the write data bus. The write or read/write channel device further comprises a write gate signal reception circuit to receive a write gate signal, and a non volatile medium write signal generator circuit to generate a non volatile medium write signal to write at least a portion of the first codeword to the non-volatile medium at a position indicated by the write gate signal.

BRIEF DESCRIPTION OF THE DRAWINGS

FIG. 6A is a flow diagram of a method that may be implemented by a hard disk controller such as the hard disk controller of FIG. 5;

FIG. 6B is a flow diagram of a method that may be implemented by a write channel device such as the read/write channel device of FIG. 5;

FIG. 9A is a flow diagram of a method that may be implemented by a hard disk controller such as the hard disk controller of FIG. 5;

FIG. 9B is a flow diagram of a method that may be implemented by a read channel device such as the read/write channel device of FIG. 5;

FIG. 11 is another example timing diagram illustrating the timing of some of the signals of the interface of FIG. 5 during a read operation;

DETAILED DESCRIPTION

Figure 1:
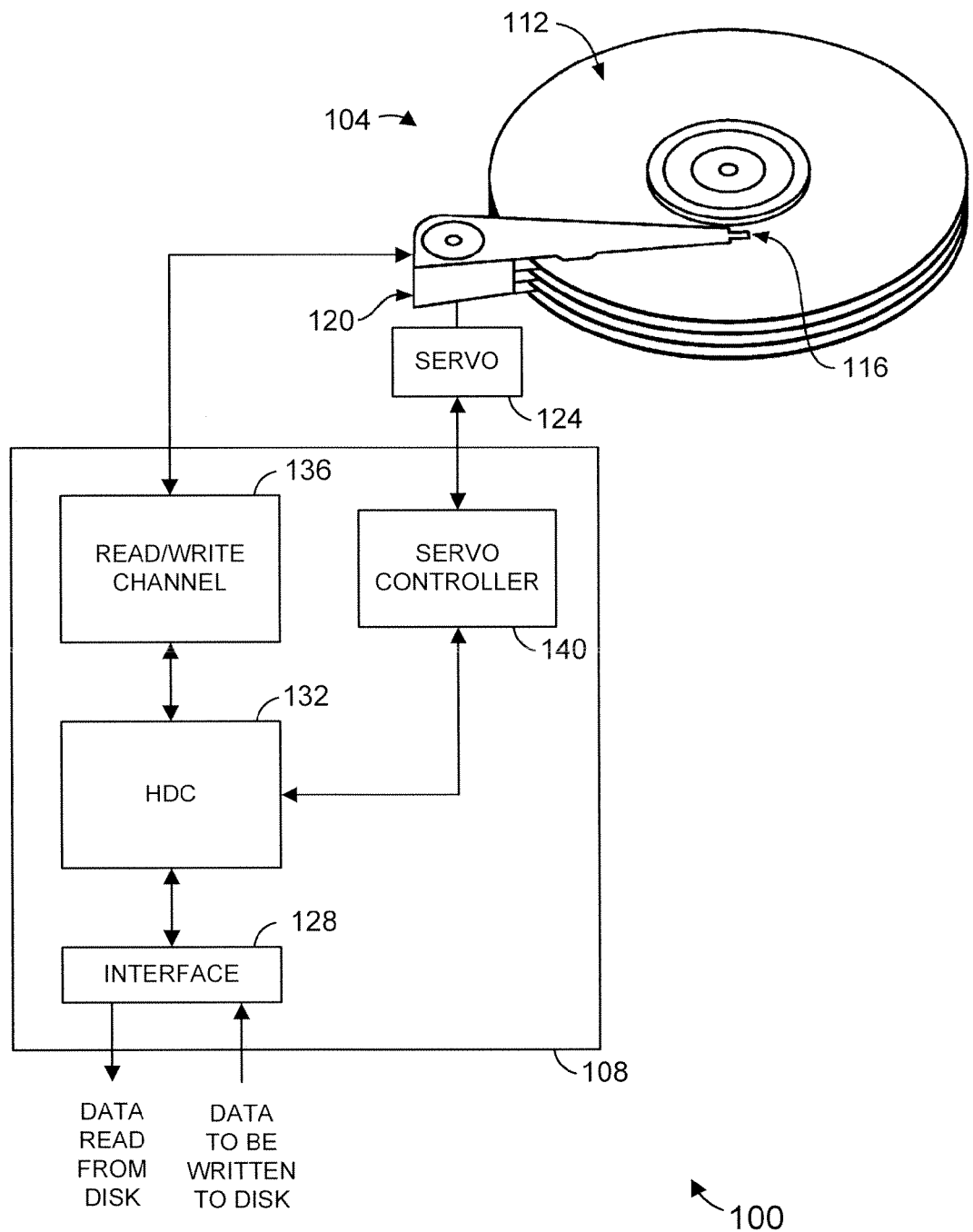
FIG. 1 is a block diagram of a prior art magnetic disk drive system.
Figure 2:
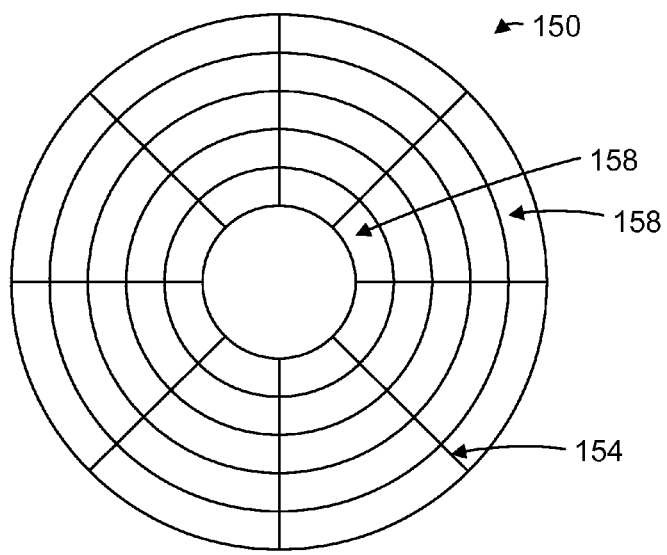
FIG. 2 is an illustration of an example magnetic media disk that may be utilized in the disk drive system of FIG. 1.
Figure 3:
FIG. 3 is an illustration of an example of a typical format of a sector on a magnetic disk.
Figure 4A:
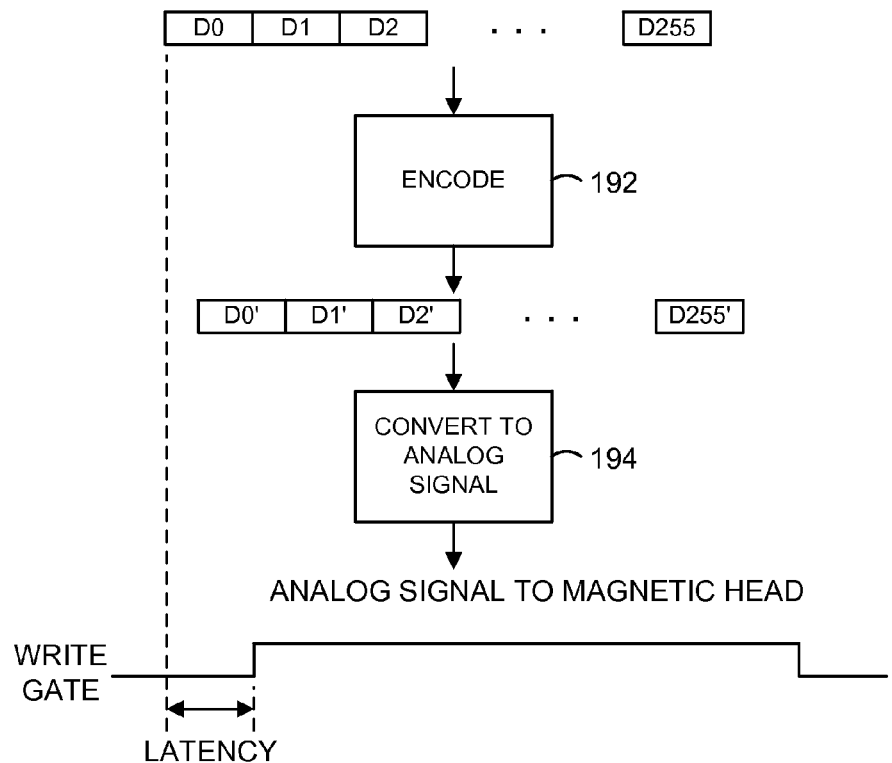
FIG. 4A is an illustration of a typical process implemented by the read/write channel device of FIG. 1 during a write operation.
Figure 4B:
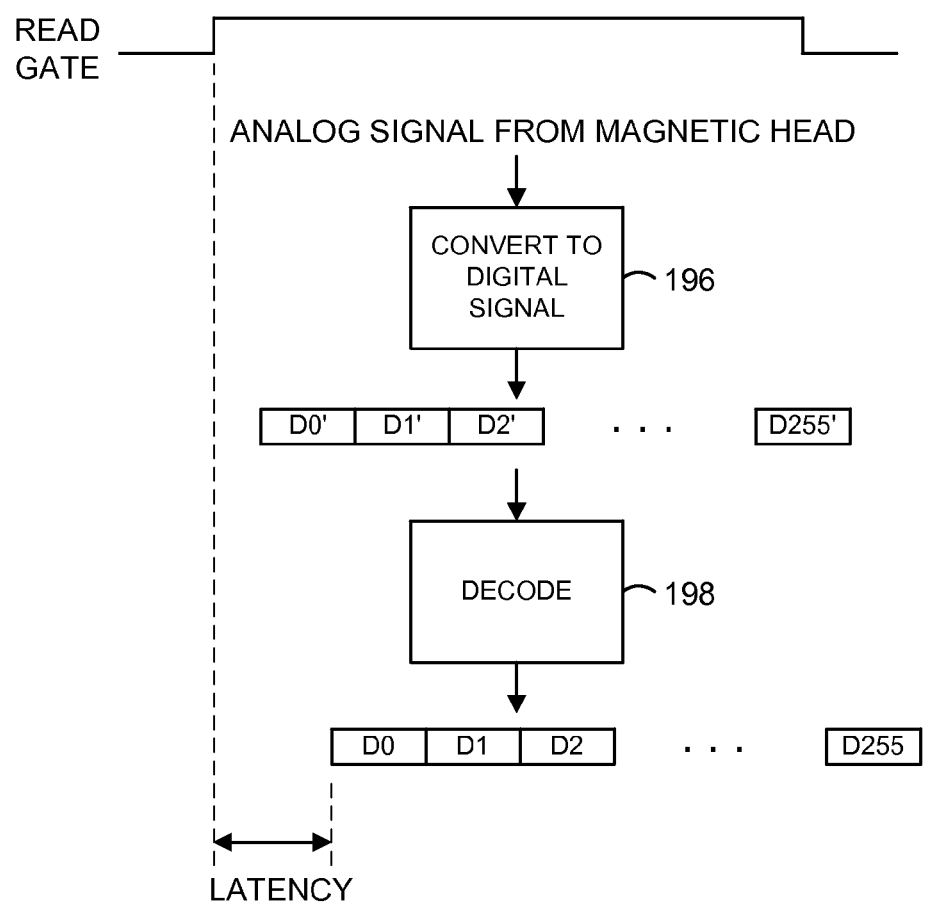
FIG. 4B is an illustration of a typical process implemented by the read/write channel device of FIG. 1 during a read operation.

As compared to the encoding technique described above with respect to FIGS. 4A and 4B, more advanced encoding techniques, such as iterative coding techniques, are being introduced into disk drive systems. These techniques may result in longer and/or variable read and write latencies. The interface between the prior art HDC 132 and the RWC 136 of FIG. 1 may not be able to accommodate such longer and/or variable latencies.

Figure 5:
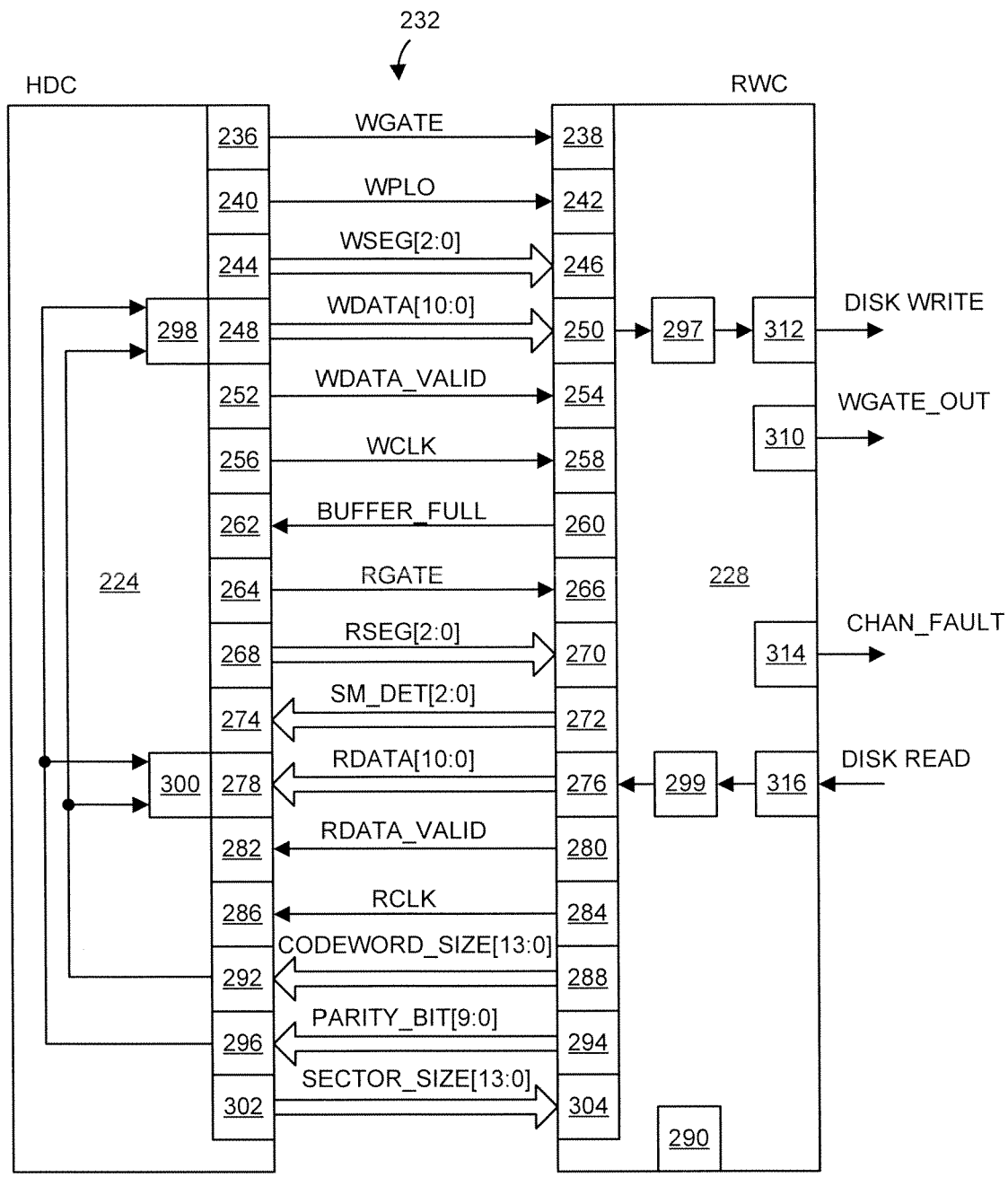
FIG. 5 is a block diagram illustrating an example of a hard disk controller, a read/write channel device, and an interface between the hard disk controller and the read/write channel device.

FIG. 5 is a block diagram illustrating an example of a hard disk controller (HDC) 224, a read/write channel device (RWC) 228, and an interface 232 between the HDC 224 and the RWC 228. The HDC 224, the RWC 228, and the interface 232 supports read and write latencies longer than what can be supported by the system of FIG. 1, as well as variable latencies, and also supports writing to and reading from split sectors. The interface 232 includes a plurality of signals generated by the HDC 224 as well as a plurality of signals generated by the RWC 228. The plurality of signals includes signals relating to writing and signals related to reading. These signals will initially be generally described. Then, these signals will be described in more detail in the context of write operations and read operations.

First, write signals of the interface 232 will be generally described. A write gate signal (WGATE) is generated by a WGATE circuit 236 of the HDC 224. WGATE generally indicates to the RWC 228 when to begin and when to end writing to the disk. The RWC 228 may include a WGATE circuit 238 to receive WGATE. A write preamble length signal (WPLO) is generated by a WPLO circuit 240 of the HDC 224. WPLO generally indicates to the RWC 228 the length of the preamble (PLO field) of the sector or sector fragment in which data is to be written. The RWC 228 may include a WPLO circuit 242 to receive WPLO. A write segment signal (WSEG[2:0]) is generated by a WSEG circuit 244 of the HDC 224. WSEG[2:0] generally indicates which fragment of a sector is to be written when WGATE is asserted. In this particular example, WSEG[2:0] is a three-bit signal. Thus, between a first and an eighth fragment may be indicated by WSEG[2:0]. Of course, a different number of bits may be utilized in other implementations. The RWC 228 may include a WSEG circuit 246 to receive WSEG[2:0]. A write data signal (WDATA[10:0]) may be generated by a WDATA circuit 248 of the HDC 224. WDATA[10:0] may be used to provide to the RWC 228 the data to be written to the disk. The RWC 228 may include a WDATA circuit 250 to receive WDATA[10:0]. A write data valid signal (WDATA_VALID) may be generated by a WDATA_VALID circuit 252 of the HDC 224. The WDATA_VALID signal may be used indicate when data on WDATA[10:0] is valid. The RWC 228 may include a WDATA_VALID circuit 254 to receive WDATA_VALID. A WCLK signal may be generated by a WCLK circuit 256 of the HDC 224. The WDATA_VALID circuit 254 and the WCLK circuit 256 may be coupled to the WDATA circuit 248. Data on the WDATA[10:0] signal may be synchronized to the WCLK signal, and the WCLK signal may be used to by the RWC 228 to latch signals received from the HDC 224, such as data provided on WDATA[10:0]. The RWC 228 may include a WCLK circuit 258 to receive WCLK. A buffer full signal (BUFFER_FULL) may be generated by a BUFFER_FULL circuit 260 of the RWC 228. BUFFER_FULL may indicate that a buffer of the RWC 228 for receiving data to be written to the disk will soon be full. The HDC 224 may include a BUFFER_FULL circuit 262 to receive BUFFER_FULL, and may utilize BUFFER_FULL to determine whether the RWC 228 may accept more data for writing to the disk, for example. The HDC 224 may be permitted to transfer, after BUFFER_FULL has been asserted, some maximum amount of data via WDATA[10:0].

Next, read signals of the interface 232 will be generally described. A read gate signal (RGATE) is generated by a RGATE circuit 264 of the HDC 224. RGATE generally indicates to the RWC 228 when to begin and when to end reading from the disk and when a sector or sector fragment begins and ends. The RWC 228 may include a RGATE circuit 266 to receive RGATE. A read segment signal (RSEG[2:0]) is generated by a RSEG circuit 268 of the HDC 224. RSEG[2:0] generally indicates which fragment of a sector is to be read. In this particular example, RSEG[2:0] is a three-bit signal. Of course, a different number of bits may be utilized in other implementations. The RWC 228 may include a RSEG circuit 270 to receive RSEG[2:0]. A sync mark detect signal (SM_DET[2:0]) may be generated by a SM_DET circuit 272 of the RWC 228. SM_DET[2:0] may be used to provide to the HDC 224 information concerning detection of sync marks by the RWC 228. The HDC 224 may include a SM_DET circuit 274 to receive SM_DET[2:0]. A read data signal (RDATA[10:0]) may be generated by a RDATA circuit 276 of the RWC 228. RDATA[10:0] may be used to provide to the HDC 224 the data that was read from the disk. The HDC 224 may include a RDATA circuit 278 to receive RDATA[10:0]. A read data valid signal (RDATA_VALID) may be generated by a RDATA_VALID circuit 280 of the RWC 228. The RDATA_VALID signal may be used indicate when data on RDATA[10:0] is valid. The HDC 224 may include a RDATA_VALID circuit 282 to receive RDATA_VALID. A RCLK signal may be generated by a RCLK circuit 284 of the RWC 228. The RCLK signal may be used to by the HDC 224 to latch signals received from the RWC 228, such as data provided on RDATA[10:0]. The HDC 224 may include a RCLK circuit 286 to receive RCLK. The RDATA circuit 278 may be coupled to the RDATA_VALID circuit 282 and the RCLK circuit 286. Data on RDATA[10:0] may be synchronized with RCLK.

A codeword size signal (CODEWORD_SIZE[13:0]) may be generated by a CODEWORD_SIZE circuit 288 of the RWC 228. CODEWORD_SIZE[13:0] may indicate to the HDC 224 the size of the codeword (e.g., codeword may include data bits and corresponding parity bits) read from or to be written to the magnetic disk. The CODEWORD_SIZE circuit 288 may include a register (not shown) to store a 14-bit value indicative of the number of bits in the codeword. The 14-bit value could represent a number of bytes, for example. Data could be written to the register via a serial interface 290 coupled to a communication bus, for example. Of course, a different number of bits may be used and the register could be accessed in a variety ways besides a serial interface, such as via a parallel interface. A CODEWORD_SIZE circuit 292 of the HDC 224 may receive CODEWORD_SIZE[13:0].

A parity bit signal (PARITY_BIT[9:0]) may be generated by a PARITY_BIT circuit 294 of the RWC 228. PARITY_BIT[9:0] may indicate to the HDC 224 the number of parity bits in the codeword read from or to be written to the magnetic disk. The PARITY_BIT circuit 294 may include a register (not shown) to store a 10-bit value indicative of a number of parity bits in the codeword. The 10-bit value could represent a number of bytes, for example. Data could be written to the register via the serial interface 290, for example. Of course, a different number of bits may be used and the register could be accessed in a variety ways besides a serial interface, such as via a parallel interface. A PARITY_BIT circuit 296 of the HDC 224 may receive PARITY_BIT[9:0].

During a write operation, an iterative encoder 297 of the RWC 228 may add one or more parity bits to each data unit (e.g., a symbol, a byte, etc.) received from the HDC 224. The iterative encoder 297 may be coupled to the CODE-WORD_SIZE circuit 288 and the PARITY_BITS circuit 294. The data unit will be less than 11-bits wide, but the data unit with the parity bits may be up to 11-bits wide. A pre-filling logic circuit 298 of the HDC 224 may append to each data unit an appropriate number of bits corresponding to the number of bits that will be added by the iterative encoder 297 of the RWC 228. The appended bits may be set to an appropriate value, such as 0. Thus, WDATA[10:0] will include the data unit plus bits appended by the pre-filling logic circuit 298. The pre-filling logic circuit 298 may be coupled to the WDATA circuit 248 to provide pre-filled data units to the WDATA circuit 248. The pre-filling logic circuit 298 also may be coupled to the CODEWORD_SIZE circuit 292 and the PARITY_BIT circuit 296. The pre-filling logic circuit 298 may determine the number of pre-filled bits to append based on, for example, the size of the codeword and the number of parity bits indicated by the CODEWORD_SIZE circuit 292 and the PARITY_BIT circuit 296.

Similarly, during a read operation, an iterative decoder 299 of the RWC 228 may decode each data unit (with appended parity bits) read from the magnetic disk. The output of the iterative decoder 299 will include the decoded data unit along with appended bits corresponding to the parity bits. The iterative decoder 299 may output the appended bits as the original parity bits read from the disk, modified parity bits produced during the decoding process, bits set to a predetermined value such as zero, etc. Thus, RDATA[10:0] will include the decoded data unit plus appended bits. A bit-stripping logic circuit 300 of the HDC 224 may strip from the data received on RDATA[10:0] the appropriate bits so that only the decoded data unit remains. The bit-stripping logic circuit 300 may be coupled to the RDATA circuit 278. The bit-stripping logic circuit 300 also may be coupled to the CODEWORD_SIZE circuit 292 and the PARITY_BITS circuit 296. The bit-stripping logic circuit 300 may determine which bits to strip based on the codeword size and the number of parity bits, for example.

A sector size signal (SECTOR_SIZE[13:0]) may be generated by a SECTOR_SIZE circuit 302 of the HDC 224. SECTOR_SIZE[13:0] may indicate to the RWC 228 the size of the sector or sector fragment to be read from or to be written to the magnetic disk when WGATE or RGATE is asserted. The 14-bit value could represent a number of bytes, for example. Of course, a different number of bits may be used. A SECTOR_SIZE circuit 304 of the RWC 228 may receive SECTOR_SIZE[3:0].

During a write operation, a WGATE_OUT signal may be generated by a WGATE_OUT circuit 310. The WGATE_OUT signal may be used to enable a preamplifier (not shown) of the hard disk system for writing to the magnetic disk. Additionally, an output of the iterative encoder 297 may be coupled to a disk write signal generation circuit 312. The disk write signal generation circuit 312 may be coupled to the SECTOR_SIZE circuit 304, the WPLO circuit 242, and the WGATE circuit 238. The disk write signal generation circuit 312 generates a disk write signal for writing the PLO field, the SM field, the codeword or the portion of the codeword, and the postamble to the disk.

During a read operation or a write operation, the RWC 228 may generate a channel fault signal (CHAN_FAULT) to indicate errors during the read operation or the write operation. CHAN_FAULT may be generated by a CHAN_FAULT circuit 314. Also during a read operation, the RWC 228 may receive a disk read signal and a disk read signal circuit 316 may receive this signal and provide it to the iterative decoder 299. The disk read signal circuit 316 may generate data corresponding to a codeword or a portion of the codeword stored on the disk at the sector or sector fragment corresponding to the asserted READ_GATE signal.

Example write operations of the HDC 224, the RWC 228, and the interface 232 of FIG. 5 will now be described in more detail with reference to FIGS. 6A, 6B, 7, and 8. FIG. 6A is a flow diagram of a method 400 that may be implemented by a hard disk controller such as the HDC 224, and FIG. 6B is a flow diagram of a method 402 that may be implemented by a write channel such as the RWC 228. FIGS. 6A and 6B are shown side-by-side in order to generally indicate relative ordering between the two methods. For example, a block 416 of the method 400 is illustrated above a block 424 of the method 402 to indicate that the block 416 should, at least in some cases, be implemented before the block 424. It will be understood by those of ordinary skill in the art, however, that the particular ordering illustrated in FIGS. 6A and 6B is not mandatory. For example, the ordering of at least some of the blocks in FIG. 6A may be modified. Similarly, the ordering of at least some of the blocks in FIG. 6B may be modified. Also, the relative ordering between the blocks of FIG. 6A and FIG. 6B with respect to at least some of the blocks may be modified. Additionally, one of ordinary skill in the art will recognize that, in at least some cases, a block need not be completed before a subsequent block is started.

Referring now to the method 400, at a block 404, an indication of a size of a codeword to be written to the disk may be sent to the write channel (WC). In the example HDC 224 and RWC 228 of FIG. 5, the HDC 224 may write this information into the CODEWORD_SIZE register of the RWC 228 via the serial interface 290. Optionally, some other device may program the CODEWORD_SIZE register, such as a microprocessor (not shown) of the hard disk control system. At a block 408, an indication of a number of parity bits in the codeword to be written to the disk may be sent to the WC. In the example HDC 224 and RWC 228 of FIG. 5, the HDC 224 may write this information into the PARITY_BITS register of the RWC 228 via the serial interface 290. Optionally, some other device may program the PARITY_BITS register, such as a microprocessor (not shown) of the hard disk control system. At a block 412, data units to be encoded may be pre-filled to accommodate parity bits generated as a result of a later encoding process. In the example of FIG. 5, the pre-fill logic 298 of the HDC 224 may pre-fill data units. The pre-fill logic 298 may utilize data received on CODEWORD_SIZE[13:0] and PARITY_BITS[9:0] to determine which bits to pre-fill. At a block 416, an amount of pre-filled data units corresponding to a codeword may be transferred to the WC. The blocks 412 and 416 may be implemented in a pipelined fashion. For example, as each pre-filled data unit is generated by the pre-fill logic 298, the WDATA circuit 248 may then transmit the pre-filled data unit on WDATA[10:0]. The pre-filled data units on WDATA[10:0] may be synchronized to WCLK signal, and the WDATA_VALID signal may indicate when data on WDATA[10:0] is valid.

Referring to the method 402, at a block 420, during the transfer 416, the WC may assert a signal that its buffer is becoming full if necessary. The signal may indicate to the HDC that, after the current transfer of the minimum, the HDC must wait for the signal to be de-asserted before more data can be transferred. In the example of FIG. 5, the RWC 228 may assert the BUFFER_FULL signal if necessary. At a block 424, the WC may encode the received data units to generate the codeword. Encoding the received data may include generating parity bits and inserting them into the pre-filled data units, for example. Any of a variety of iterative encoding techniques may be utilized, including currently known techniques. As just one example, a turbo coding technique may be utilized.

Referring again to the method 400, at a block 428, WGATE may be asserted when the WC is ready to begin writing the codeword. For example, WGATE could be asserted after some determined minimum amount of time required for encoding the codeword. The minimum amount of time could be determined based on the size of the particular codeword, for example. Also, the minimum amount of time could be determined based on the size of a largest possible codeword. The minimum amount of time may be dependent on the type of encoding technique utilized. For example, some encoding techniques may not lend themselves to writing the sector or sector fragment until the entire codeword is generated. With other encoding techniques, however, it may be possible to begin writing the codeword before the entire codeword has been generated. Additionally, WGATE should be asserted when the magnetic head is at an appropriate position over the magnetic disk (i.e., when the magnetic head is at the sector or sector fragment to which the transferred data is to be written). In the example of FIG. 5, the HDC 224 may assert WGATE when the RWC 228 is ready to begin writing the codeword or the portion of the codeword and when the magnetic head is at an appropriate position over the magnetic disk (i.e., when the magnetic head is at the sector or sector fragment to which the codeword or the portion of the codeword is to be written).

As discussed above with respect to the example of FIG. 5, the RWC 228 generates WGATE_OUT to enable the preamplifier for writing. Thus, referring again to the method 402, WGATE_OUT may be asserted at a block 432 when WGATE has been asserted.

Referring again to the method 400, at a block 436, an indication of the sector fragment that is to be written when WGATE is asserted may be transferred to the WC. In the example of FIG. 5, the HDC 224 may indicate to the RWC 228 the sector fragment via WSEG[2:0]. At a block 440, an indicator of the PLO field length may be transferred to the WC. In the example of FIG. 5, the HDC 224 may indicate to the RWC 228 the length of the PLO field by asserting WPLO for a particular number of cycles of WCLK. Optionally, the size of the PLO field could be indicated via a register in the WC. Such a register could be accessed via a serial interface or a parallel interface, for example. At a block 442, an indicator of the sector or sector fragment size may be transferred to the WC. In the example of FIG. 5, the HDC 224 may indicate to the RWC 228 the size of the sector via SECTOR_SIZE[13:0]. If the sector size is less than the codeword size, this may indicate to the RWC 228 that the current sector is a split sector.

Referring again to the method 402, at a block 444, the WC may generate a signal corresponding to the PLO field that causes the PLO field to be written to the disk. At a block 448, the WC may generate a signal corresponding to the SM field to cause the SM field to be written to the disk. At a block 450, the WC may generate a signal corresponding to the codeword to cause the codeword to be written to the disk. At a block 454, the WC may generate a signal corresponding to a postamble field to cause the postamble field to be written to the disk. Referring to the example of FIG. 5, the RWC 228 may generate the signals corresponding to the PLO field, the SM field, the codeword, and the postamble. The signals may be coupled to the magnetic head to cause the PLO field, the SM field, the codeword, and the postamble to be written on an appropriate portion of the disk.

Referring to the method 400, after the codeword has been written to the disk, WGATE may be de-asserted. Referring to the example of FIG. 5, the HDC 224 may de-assert WGATE to cause the RWC 228 to stop writing data. Referring to the method 402, the WC may de-assert the WGATE_OUT signal when WGATE is de-asserted. In the example of FIG. 5, the RWC 228 may de-assert WGATE_OUT. WGATE could be a synchronous signal (i.e., a signal synchronous with a clock signal such as WCLK). On the other hand, WGATE_OUT may be an asynchronous signal (i.e., not synchronous with a clock signal).

Figure 7:
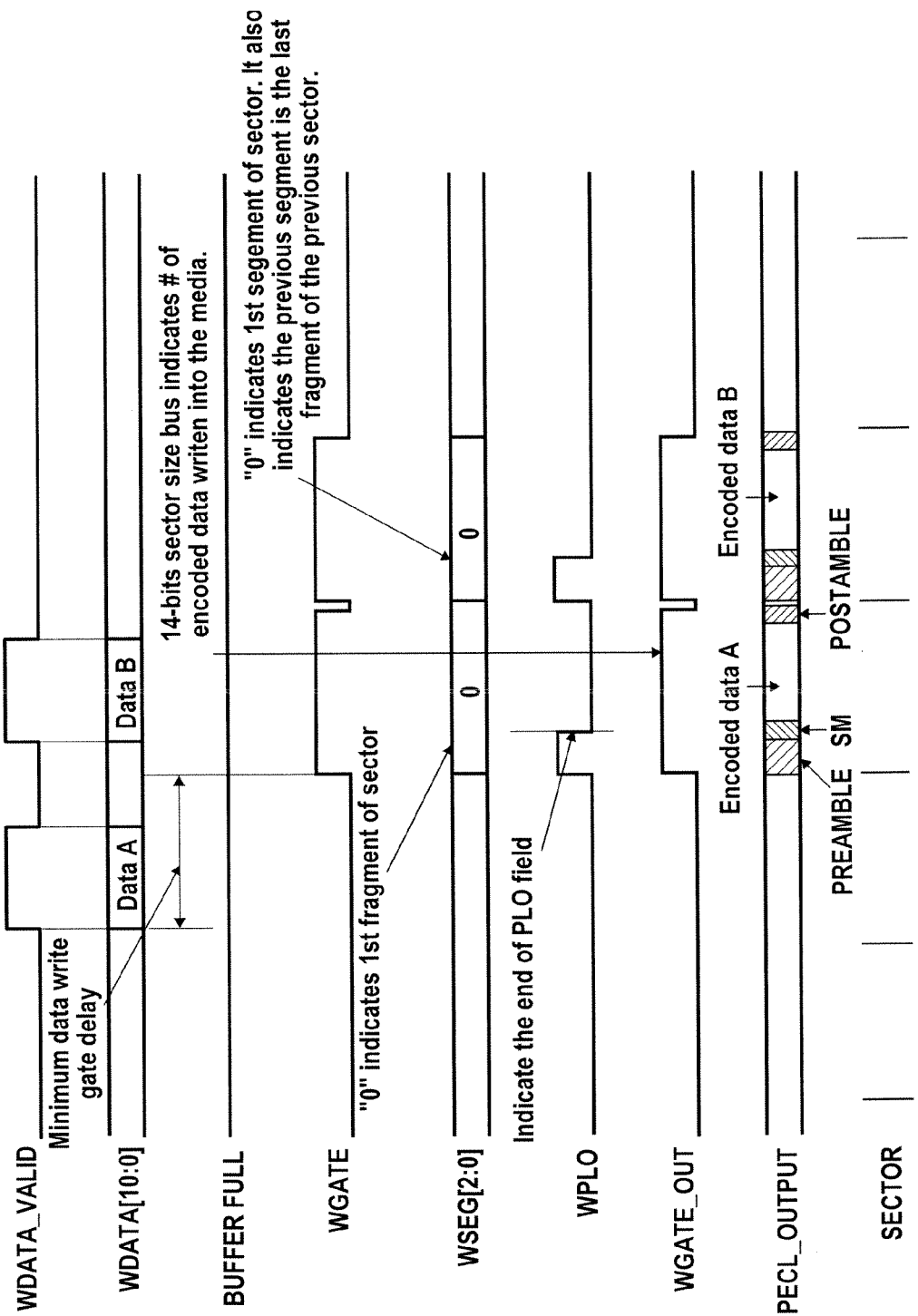
FIG. 7 is an example timing diagram illustrating the timing of some of the signals of the interface of FIG. 5 during a write operation.

FIG. 7 is an example timing diagram illustrating the timing of some of the signals of the interface 232 of FIG. 5. In particular, FIG. 7 illustrates signals associated with a first group of data units (Data A) and a second group of data units (Data B) being written to adjacent sectors. First, Data A is transferred from the HDC 224 to the RWC 228 via WDATA [10:0]. Assertion of WDATA_VALID generally indicates to the RWC 228 when data on WDATA[10:0] is valid. The data units are clocked using WCLK (not shown in FIG. 7). In other words, for each period of WCLK a data unit is transferred. For example, a different data unit could be latched by the RWC 228 on each rising edge of WCLK. Alternatively, of course, a different data unit could be latched by the RWC 228 on each falling edge of WCLK. Data A is transferred prior to when the magnetic head reaches the sector in which Data A is to be written so that the RWC 228 has ample time to encode Data A. For example, Data A could be transferred at least a minimum time prior to the beginning of the sector to which it is to be written. The minimum time could be measured from the beginning of the group of data units, as indicated in FIG. 7. Alternatively, the minimum time could be measured from the end of the group of data units. As described above, the group of data units should be transferred early enough such that the RWC 228 has enough time to iteratively encode the data units so that each encoded data unit is available when it is needed by the RWC 228 for writing. After the RWC 228 receives Data A, it iteratively encodes Data A as described above.

A time period after the transfer of Data A, and approximately at a sector boundary, the HDC 224 asserts WGATE (sector boundaries are generally indicated in FIG. 7 by the vertical lines in the row labeled "SECTOR"). Additionally, the HDC 224 sets WSEG[2:0] to 0 0 0 to indicate to the RWC 228 that the data to be written is a first (and possibly only) fragment of the sector. Further, the HDC 224 sets SECTOR_SIZE[13:0] to indicate to the RWC 228 the size of the sector or sector fragment. Still further, the HDC 224 asserts WPLO for a particular number of WCLK cycles to indicate to the RWC 228 the size of the PLO field.

Next, the RWC 228 asserts WGATE_OUT. Also RWC 228 generates a signal that is coupled to the magnetic head. This signal corresponds to the PLO field, the SM field, the codeword corresponding to the encoded Data A, and the postamble field, and is timed so that the data is written within the sector. Approximately at the end of the PLO field, the HDC 224 de-asserts WPLO. Also, at the end of the sector, the HDC 224 de-asserts WGATE. In response, the RWC 228 de-asserts WGATE_OUT.

While the RWC 228, is writing the codeword corresponding to the encoded Data A, the HDC 224 may begin transferring a next group of data units (Data B) to be stored in the next sector. For example, the HDC 224 may assert WDATA_VALID when appropriate, and the data units may be clocked using WCLK (not shown in FIG. 7). As with Data A, Data B is transferred prior to when the magnetic head reaches the sector in which Data B is to be written so that the RWC 228 has ample time to encode Data B. After the RWC 228 receives Data B, it iteratively encodes Data B as described above.

A time period after the transfer of Data B, and approximately at a sector boundary, the HDC 224 again asserts WGATE. Additionally, the HDC 224 sets WSEG[2:0] to 0 0 0 to indicate to the RWC 228 that the data to be written is a first (and possibly only) fragment of the sector. Further, the HDC 224 sets SECTOR_SIZE[13:0] to indicate to the RWC 228 the size of the sector or sector fragment. Still further, the HDC 224 asserts WPLO for a particular number of WCLK cycles to indicate to the RWC 228 the size of the PLO field.

Next, the RWC 228 again asserts WGATE_OUT. Also RWC 228 generates a signal that is coupled to the magnetic head. This signal corresponds to the PLO field, the SM field, the codeword corresponding to the encoded Data B, and the postamble field, and is timed so that the data is written within the sector. Approximately at the end of the PLO field, the HDC 224 de-asserts WPLO. Also, at the end of the sector, the HDC 224 de-asserts WGATE. In response, the RWC 228 de-asserts WGATE_OUT.

Figure 8:
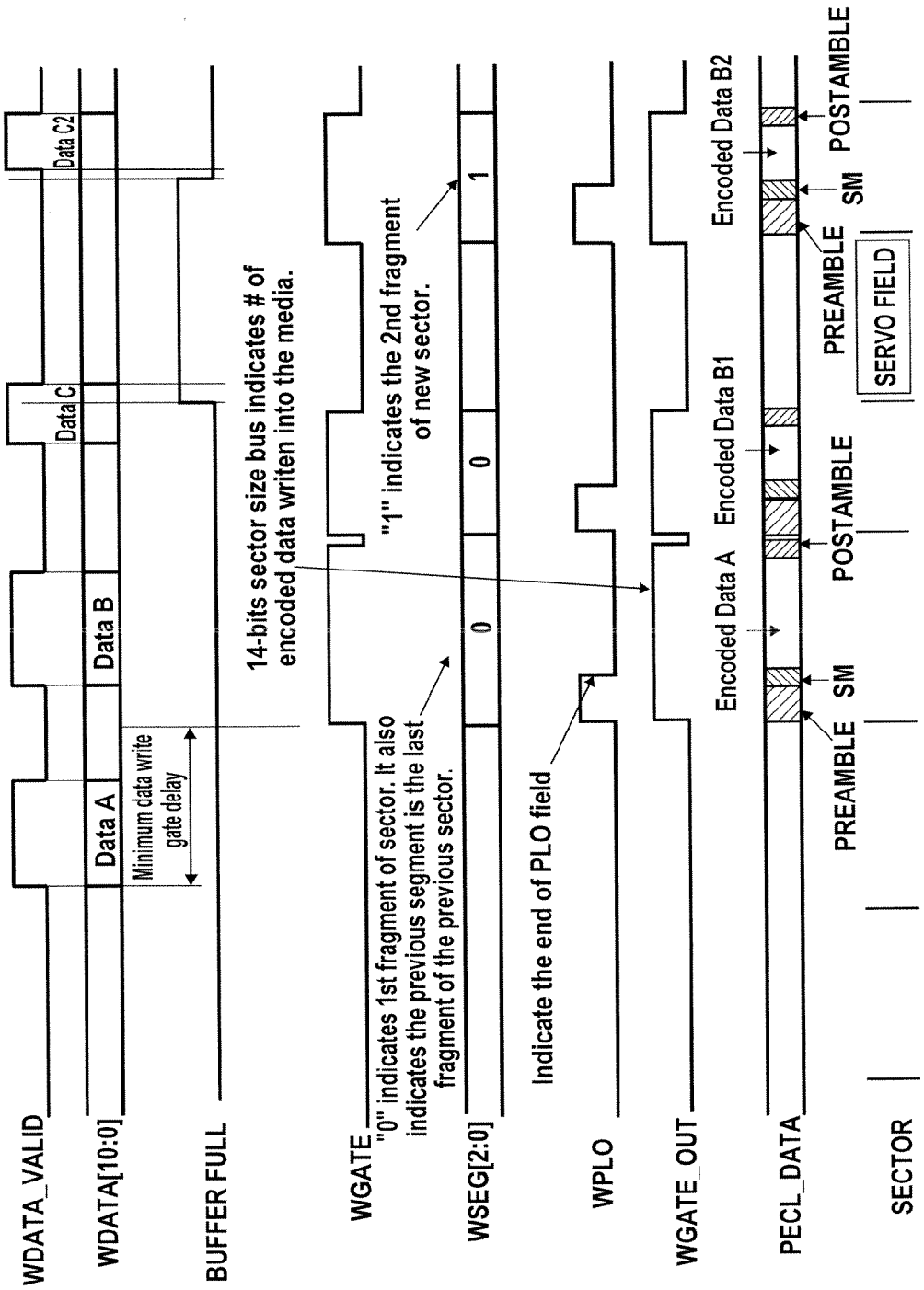
FIG. 8 is another example timing diagram illustrating the timing of some of the signals of the interface of FIG. 5 during a write operation.

FIG. 8 is an example timing diagram similar to the timing diagram of FIG. 7. In FIG. 8, however, the second group of data units (Data B) is being written to a split sector. The portion of the timing diagram of FIG. 8 corresponding to the writing of the encoded Data A is the same as FIG. 7 and will not be discussed. While the RWC 228, is writing the codeword corresponding to the encoded Data A, the HDC 224 may begin transferring a next group of data units (Data B) to be stored in the next sector. For example, the HDC 224 may assert WDATA_VALID when appropriate, and the data units may be clocked using WCLK (not shown in FIG. 7). As with Data A, Data B is transferred prior to when the magnetic head reaches the sector in which Data B is to be written so that the RWC 228 has ample time to encode Data B. After the RWC 228 receives Data B, it iteratively encodes Data B as described above.

A time period after the transfer of Data B, and approximately at a sector boundary, the HDC 224 again asserts WGATE. Additionally, the HDC 224 sets WSEG[2:0] to 0 0 0 to indicate to the RWC 228 that the data to be written is a first fragment of the sector. Further, the HDC 224 sets SECTOR_SIZE[13:0] to indicate to the RWC 228 the size of the sector fragment. Because the sector size is smaller than the codeword size, the RWC 228 will know to only write a portion of the encoded Data B initially. Still further, the HDC 224 asserts WPLO for a particular number of WCLK cycles to indicate to the RWC 228 the size of the PLO field.

Next, the RWC 228 again asserts WGATE_OUT. Also RWC 228 generates a signal that is coupled to the magnetic head. This signal corresponds to the PLO field, the SM field, the portion of the codeword corresponding to the encoded Data B, and the postamble field, and is timed so that the data is written within the sector fragment. Approximately at the end of the PLO field, the HDC 224 de-asserts WPLO. Also, at the end of the sector fragment, the HDC 224 de-asserts WGATE. In response, the RWC 228 de-asserts WGATE_OUT.

After the servo field, the HDC 224 again asserts WGATE. Additionally, the HDC 224 sets WSEG[2:0] to 0 0 1 to indicate to the RWC 228 that the data to be written is a second fragment of the sector. Further, the HDC 224 sets SECTOR_SIZE[13:0] to indicate to the RWC 228 the size of the second sector fragment. The RWC 228 will know to only write the remaining portion of the encoded Data B. Still further, the HDC 224 asserts WPLO for a particular number of WCLK cycles to indicate to the RWC 228 the size of the PLO field.

Next, the RWC 228 again asserts WGATE_OUT. Also RWC 228 generates a signal that is coupled to the magnetic head. This signal corresponds to the PLO field, the SM field, the remaining portion of the codeword corresponding to, the encoded Data B, and the postamble field, and is timed so that the data is written within the sector fragment. Approximately at the end of the PLO field, the HDC 224 de-asserts WPLO. Also, at the end of the sector fragment, the HDC 224 de-asserts WGATE. In response, the RWC 228 de-asserts WGATE_OUT.

While the RWC 228, is writing the first portion of the codeword corresponding to the encoded Data B, the HDC 224 may begin transferring a next group of data units (Data C) to be stored in the next sector. For example, the HDC 224 may assert WDATA_VALID when appropriate, and the data units may be clocked using WCLK (not shown in FIG. 7). As with Data A and Data B, Data C is transferred prior to when the magnetic head reaches the sector in which Data C is to be written so that the RWC 228 has ample time to encode Data C. It can be seen in FIG. 8 that the RWC 228 asserts BUFFER_FULL during the transfer of Data C. In response and after a delay, the HDC 224 pauses the data transfer and waits for the RWC 228 to de-assert BUFFER_FULL. When ready, the RWC 228 de-asserts BUFFER_FULL, and after a delay, the HDC 224 resumes the transfer of Data C. In the example of FIG. 8, this begins while the RWC 228 is writing the remaining portion of the codeword corresponding to the encoded Data B.

Example read operations of the HDC 224, the RWC 228, and the interface 232 of FIG. 5 will now be described in more detail with reference to FIGS. 9A, 9B, 10, and 11. FIG. 9A is a flow diagram of a method 500 that may be implemented by a hard disk controller such as the HDC 224, and FIG. 6B is a flow diagram of a method 502 that may be implemented by a read channel such as the RWC 228. FIGS. 9A and 9B are shown side-by-side in order to generally indicate relative ordering between the two methods. For example, a block 512 of the method 500 is illustrated above a block 532 of the method 502 to indicate that the block 512 should be implemented before the block 532. It will be understood by those of ordinary skill in the art, however, that the particular ordering illustrated in FIGS. 9A and 9B is not mandatory. For example, the ordering of at least some of the blocks in FIG. 9A may be modified. Similarly, the ordering of at least some of the blocks in FIG. 9B may be modified. Also, the relative ordering between the blocks of FIG. 9A and FIG. 9B with respect to at least some of the blocks may be modified. Additionally, one of ordinary skill in the art will recognize that, in at least some cases, a block need not be completed before a subsequent block is started.

Referring now to the method 500, at a block 404, an indication of a size of a codeword to be read from the disk may be sent to the read channel (RC). In the example HDC 224 and RWC 228 of FIG. 5, the HDC 224 may write this information into the CODEWORD_SIZE register of the RWC 228 via the serial interface 290. Optionally, some other device may program the CODEWORD_SIZE register, such as a microprocessor (not shown) of the hard disk control system. At a block 508, an indication of a number of parity bits in the codeword to be read from the disk may be sent to the RC. In the example HDC 224 and RWC 228 of FIG. 5, the HDC 224 may write this information into the PARITY_BITS register of the RWC 228 via the serial interface 290. Optionally, some other device may program the PARITY_BITS register, such as a microprocessor (not shown) of the hard disk control system.

At a block 512, RGATE may be asserted approximately when the magnetic head is at the boundary of the sector or sector fragment. At a block 516, an indication of the sector fragment that is to be read may be transferred to the RC. In the example of FIG. 5, the HDC 224 may indicate to the RWC 228 the sector fragment via RSEG[2:0]. At a block 520, an indicator of the sector or sector fragment size may be transferred to the RC. In the example of FIG. 5, the HDC 224 may indicate to the RWC 228 the size of the sector via SECTOR_SIZE[13:0]. If the sector size is less than the codeword size, this may indicate to the RWC 228 that the current sector is a split sector.

Referring now to the method 502, at a block 522, the RC may begin reading from the magnetic disk approximately when RGATE is asserted. After reading the SM field, the RC may transfer to the HDC information related to the SM. This information may include an indication of whether the sync mark was detected, the type of sync mark detected, etc. In the example of FIG. 5, the RWC 228 may transfer SM_DET[2:0] to the HDC 224. In one implementation, a value of 1 0 0 may indicate that no SM was found, a value of 1 0 1 may indicate that SM 1 was detected, a value of 110 may indicate that SM 2 was detected, and a value of 1 1 1 may indicate that a force sync was detected. Of course, one of ordinary skill in the art will recognize many variations such as using a different numbers of bits, using different value assignments, conveying more or less information, etc.

Referring to the method 500, at the end of the sector or sector fragment, RGATE may be de-asserted by the HDC at a block 528. Referring to the method 502, at a block 532, the RC may decode the encoded data units in the sector if possible. For example, if the sector is a split sector and depending on the encoding technique, the RC may be unable to decode the data units until all fragments of the sector have been read. As another example, if there are too many errors, the RC may be unable to decode the data units, or some of the data units. At a block 536, the RC may transfer decoded units to the HDC. In the example of FIG. 5, the RWC 228 may transfer decoded data units to the HDC 224 via RDATA[10:0]. The decoded data units transferred via RDATA[10:0] may include parity bits or parity place holder bits. Referring to the method 500, at a block 540, the HDC may remove the parity bits or parity place holder bits. In the example of FIG. 5, the bit-stripping logic circuit 300 of the HDC 224 may strip from the data received on RDATA[10:0] the appropriate bits so that only the decoded data unit remains. The bit-stripping logic 300 may utilize data received on CODEWORD_SIZE[13:0] and PARITY_BITS[9:0] to determine which bits to strip.

Figure 10:
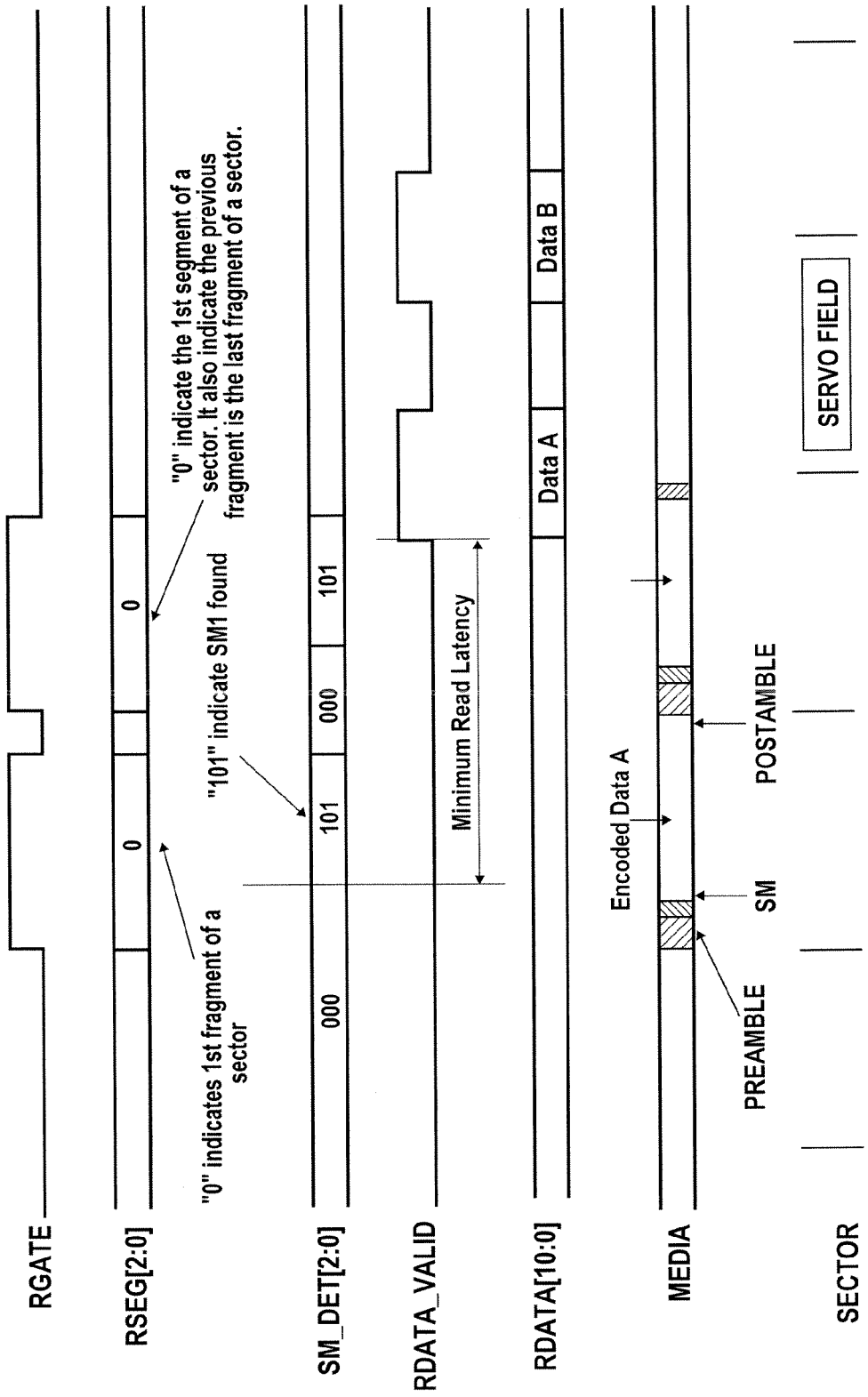
FIG. 10 is an example timing diagram illustrating the timing of some of the signals of the interface of FIG. 5 during a read operation.

FIG. 10 is an example timing diagram illustrating the timing of some of the signals of the interface 232 of FIG. 5. In particular, FIG. 10 illustrates signals associated with a first group of data units (Data A) and a second group of data units (Data B) being read from adjacent sectors. First, RGATE is asserted at approximately the sector boundary of the sector in which encoded Data A is located. Additionally, the HDC 224 sets WSEG[2:0] to 0 0 0 to indicate to the RWC 228 that the data to be read is a first (and possibly only) fragment of the sector. Although not shown in FIG. 10, the HDC 224 sets SECTOR_SIZE[13:0] to indicate to the RWC 228 the size of the sector or sector fragment to be read.

In response to the assertion of RGATE, the RWC 228 begins to read data from the sector. By default, the RWC 228 sets SM_DET[2:0] to 0 0 0 to indicate a SM has not been detected. But when RWC 228 does detect a SM, it changes SM_DET[2:0] accordingly. For example, after the RWC 228 reads the SM from the sector in which encoded Data A is stored, it changes SM_DET[2:0] to 1 0 1 to indicate that a SM 1 was detected. Near the end of the sector, HDC 224 will de-assert RGATE. Prior to an assertion of RGATE, there may be a minimum time period during which RGATE must be de-asserted. For example, it may be some number of cycles of RCLK such as 2. In other implementations, RGATE must be de-asserted for a different number of RCLK such as 1 or 3, 4, etc. After the sector in which encoded Data A has been read, the RWC 228 may begin to iteratively decode Data A.

After the minimum period of de-assertion of RGATE, it may again be asserted approximately at the next sector boundary in order to read the sector in which encoded Data B is stored. Additionally, the HDC 224 sets WSEG[2:0] to 0 0 0 to indicate to the RWC 228 that the data to be read is a first (and possibly only) fragment of the sector. Although not shown in FIG. 10, the HDC 224 sets SECTOR_SIZE[13:0] to indicate to the RWC 228 the size of the sector or sector fragment to be read.

In response to the assertion of RGATE, the RWC 228 begins to read data from the sector. When RWC 228 detects a SM, it changes SM_DET[2:0] accordingly. For example, after the RWC 228 reads the SM from the sector in which encoded Data B is stored, it changes SM_DET[2:0] to 1 0 1 to indicate that a SM 1 was detected. Near the end of the sector, HDC 224 will de-assert RGATE.

During the period when RWC 228 is reading data from the sector in which encoded Data B is stored, it may finish iteratively decoding Data A. Then, Data A is transferred from the RWC 228 to the HDC 224 via RDATA[10:0]. Assertion of RDATA_VALID generally indicates to the HDC 224 when data on RDATA[10:0] is valid. The data units are clocked using RCLK (not shown in FIG. 10). In other words, for each period of RCLK a data unit is transferred. For example, a different data unit could be latched by the HDC 224 on each rising edge of RCLK. Alternatively, of course, a different data unit could be latched by the HDC 224 on each falling edge of RCLK. There may be a minimum amount of time after which Data A should be ready. The minimum time could be measured from the time at which SM_DET[2:0] is changed, as indicated in FIG. 7. Alternatively, the minimum time could be measured from when RGATE is asserted corresponding to the sector in which encoded Data A was stored. At some time after RGATE is again de-asserted, the RWC 228 will finish decoding Data B and will transfer Data B to the HDC 224 via RDATA[10:0]. Similar to Data A, Data B may be ready for transfer after the minimum time period measured, for example, starting from the time at which SM_DET[2:0] is changed.

FIG. 11 is an example timing diagram similar to the timing diagram of FIG. 10. In FIG. 11, however, the second group of data units (Data B) is read from a split sector. The portion of the timing diagram of FIG. 11 corresponding to the reading of Data A is the same as FIG. 10 and will not be discussed.

After the minimum period of de-assertion of RGATE, it may again be asserted approximately at the next sector boundary in order to read the sector in which encoded Data B is stored. Additionally, the HDC 224 sets WSEG[2:0] to 0 0 0 to indicate to the RWC 228 that the data to be read is a first fragment of the sector. Although not shown in FIG. 11, the HDC 224 sets SECTOR_SIZE[13:0] to indicate to the RWC 228 the size of the sector fragment to be read.

In response to the assertion of RGATE, the RWC 228 begins to read data from the sector fragment. When RWC 228 detects a SM, it changes SM_DET[2:0] accordingly. For example, after the RWC 228 reads the SM from the sector in which encoded Data B is stored, it changes SM_DET[2:0] to 1 0 1 to indicate that a SM 1 was detected. Near the end of the sector fragment, HDC 224 will de-assert RGATE.

After the servo field and approximately at the boundary of the next sector fragment, the HDC 224 may again assert RGATE in order to read the next sector fragment corresponding to Data B. Additionally, the HDC 224 sets WSEG[2:0] to 0 0 1 to indicate to the RWC 228 that the data to be read is a second fragment of the sector. Although not shown in FIG. 11, the HDC 224 sets SECTOR_SIZE[13:0] to indicate to the RWC 228 the size of the sector fragment to be read.

In response to the assertion of RGATE, the RWC 228 begins to read data from the sector fragment. When RWC 228 detects a SM, it changes SM_DET[2:0] accordingly. For example, after the RWC 228 reads the SM from the sector in which encoded Data B is stored, it changes SM_DET[2:0] to 1 0 1 to indicate that a SM 1 was detected. Near the end of the sector fragment, HDC 224 will de-assert RGATE. At some time after RGATE is again de-asserted, the RWC 228 will finish decoding Data B and will transfer Data B to the HDC 224 via RDATA[10:0].

In one embodiment, a method for causing data to be read from a non-volatile medium may include transmitting to a channel device an indication of a size of a sector or a sector fragment, and transmitting to the channel device an indication of a size of a codeword to be read from the sector. The method may also include transmitting to the channel device a read gate signal corresponding to the sector or the sector fragment to indicate to the channel device when to read from the sector or the sector fragment. The method additionally may include receiving a sync mark detection signal from the channel device, and receiving decoded data from the channel device.

In another embodiment, a non-volatile medium controller to control a channel device may comprise a sector or sector fragment size indicator bus generator circuit to generate an indication of a size of a sector or sector fragment on a non-volatile medium from which data is to be read. The non-volatile medium controller also may comprise a read clock reception circuit, and a read data bus reception circuit coupled to the read clock reception circuit. The read data bus synchronized to the read clock and to provide data read from the sector or sector fragment. The non-volatile medium controller also may comprise a bit-stripping logic circuit coupled to the read data bus reception circuit. Further, the non-volatile medium controller may comprise a read gate signal generation circuit to generate a read gate signal indicative of the location of the sector or sector fragment.

In yet another embodiment, a method for reading data from a non-volatile medium may include receiving an indication of a size of a sector or a sector fragment, and receiving an indication of a size of a codeword to be read from the sector. The method additionally may include receiving a read gate signal corresponding to the sector or the sector fragment, and in response to the read gate signal, reading encoded data from the non-volatile medium. Also, the method may include if all of the codeword has been read from the non-volatile medium, iteratively decoding the codeword, and transmitting the decoded data to a non-volatile medium controller.

In still another embodiment, a channel device may comprise a read gate signal reception circuit to indicate a sector or a sector fragment of a non-volatile medium from which a codeword is to be read. Also, the channel device may comprise a non-volatile medium read signal reception circuit coupled to the read gate signal reception circuit to generate data read from the sector or the sector fragment. Additionally, the channel device may comprise a sector or sector fragment size indicator bus reception circuit to receive and indication of a size of the sector or the sector fragment. The channel device also may comprise a codeword size register coupled to a communication bus interface circuit, the codeword size register to indicate a size of the codeword stored on the non-volatile medium. Additionally, the channel device may comprise an iterative decoder coupled to the codeword size register and the non-volatile medium read signal reception circuit. Also, the read channel device may comprise a read data bus generation circuit coupled to the iterative decoder. Further, the channel device may comprise a read clock generation circuit. The read data bus may be synchronized with the read clock and may provide decoded data generated by the iterative decoder.

Although the methods, systems, techniques, etc., described above were in the context of a magnetic disk system, they may be utilized in other contexts as well such as optical disk drives, magnetic tape drives, etc. Additionally, the methods, systems, techniques, etc., described above may be utilized in a variety of devices that employ non-volatile storage. Referring now to FIGS. 12A-12G, various exemplary devices that may utilize the techniques described above will be described. For example, referring to FIG. 12A, a hard disk drive 600 may utilize the above-described techniques, which may be implemented by signal processing and/or control circuits, which are generally identified in FIG. 12A at 402. In some implementations, signal processing and/or control circuit 602 and/or other circuits (not shown) in HDD 600 may process data, perform coding and/or encryption, perform calculations, and/or format data that is output to and/or received from a magnetic storage medium 606.

HDD 600 may communicate with a host device (not shown) such as a computer, mobile computing devices such as personal digital assistants, cellular phones, media or MP3 players and the like, and/or other devices via one or more wired or wireless communication links 608. HDD 600 may be connected to memory 609, such as random access memory (RAM), a low latency nonvolatile memory such as flash memory, read only memory (ROM) and/or other suitable electronic data storage.

Figure 12A:
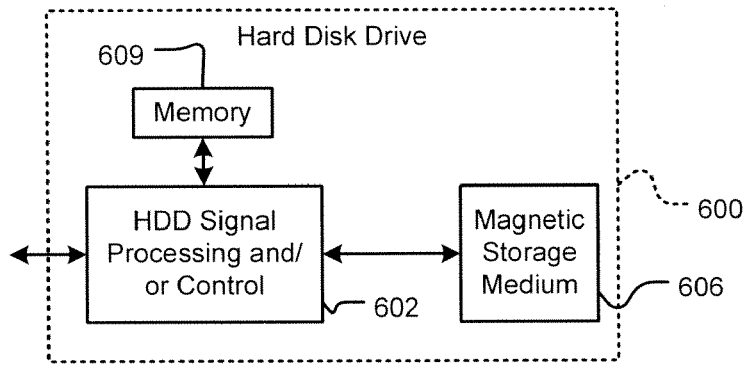
FIG. 12A is a block diagram of a hard disk drive system that may utilize the hard disk controller and the read/write channel device of FIG. 5.
Figure 12B:
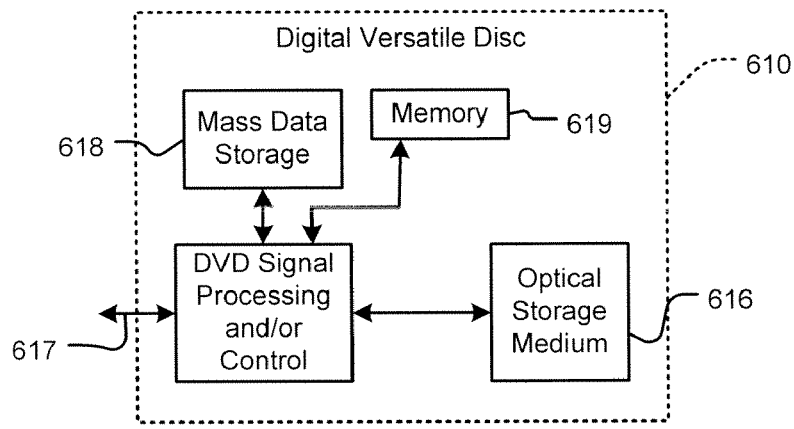
FIG. 12B is a block diagram of a digital versatile drive system that may utilize a controller and a read/write channel device similar to the hard disk controller and the read/write channel device of FIG. 5.

Referring now to FIG. 12B, the techniques may be utilized in a digital versatile disc (DVD) drive 610. The techniques may be implemented by either or both signal processing and/or control circuits, which are generally identified in FIG. 12B at 612, and/or mass data storage 618 of DVD drive 610. Signal processing and/or control circuit 612 and/or other circuits (not shown) in DVD 610 may process data, perform coding and/or encryption, perform calculations, and/or format data that is read from and/or data written to an optical storage medium 616. In some implementations, signal processing and/or control circuit 612 and/or other circuits (not shown) in DVD 610 can also perform other functions such as encoding and/or decoding and/or any other signal processing functions associated with a DVD drive.

DVD drive 610 may communicate with an output device (not shown) such as a computer, television or other device via one or more wired or wireless communication links 617. DVD 610 may communicate with mass data storage 618 that stores data in a nonvolatile manner. Mass data storage 618 may include a hard disk drive (HDD) such as that shown in FIG. 12B. The HDD may be a mini HDD that includes one or more platters having a diameter that is smaller than approximately 1.8". DVD 610 may be connected to memory 619, such as RAM, ROM, low latency nonvolatile memory such as flash memory, and/or other suitable electronic data storage.

Figure 12C:
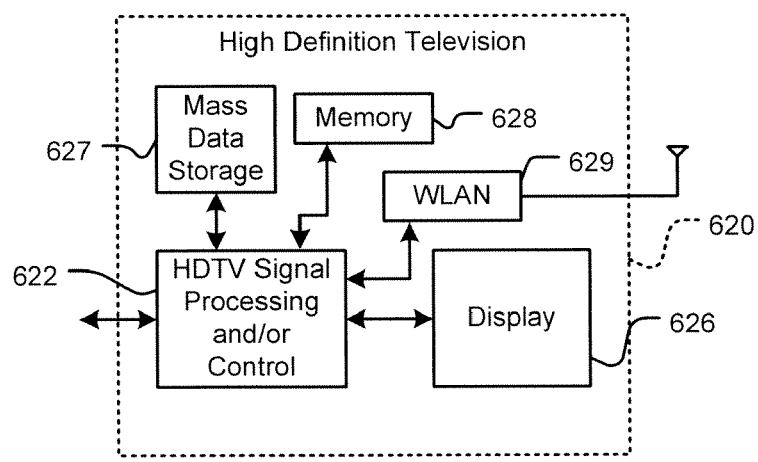
FIG. 12C is a block diagram of a high definition television that may utilize the hard disk controller and the read/write channel device of FIG. 5.

Referring now to FIG. 12C, the techniques may be utilized in a high definition television (HDTV) 620. The HDTV 620 includes signal processing and/or control circuits, which are generally identified in FIG. 12C at 622, a WLAN interface 629, and a mass data storage 627. The techniques may be utilized in the mass storage device 627, for example. HDTV 620 receives HDTV input signals in either a wired or wireless format and generates HDTV output signals for a display 626. In some implementations, signal processing circuit and/or control circuit 622 and/or other circuits (not shown) of HDTV 620 may process data, perform coding and/or encryption, perform calculations, format data and/or perform any other type of HDTV processing that may be required.

HDTV 620 may communicate with mass data storage 627 that stores data in a nonvolatile manner such as optical and/or magnetic storage devices. At least one HDD may have the configuration shown in FIG. 12A and/or at least one DVD may have the configuration shown in FIG. 12B. The HDD may be a mini HDD that includes one or more platters having a diameter that is smaller than approximately 1.8". HDTV 620 may be connected to memory 628 such as RAM, ROM, low latency nonvolatile memory such as flash memory and/or other suitable electronic data storage. HDTV 620 also may support connections with a WLAN via a WLAN network interface 629.

Figure 12D:
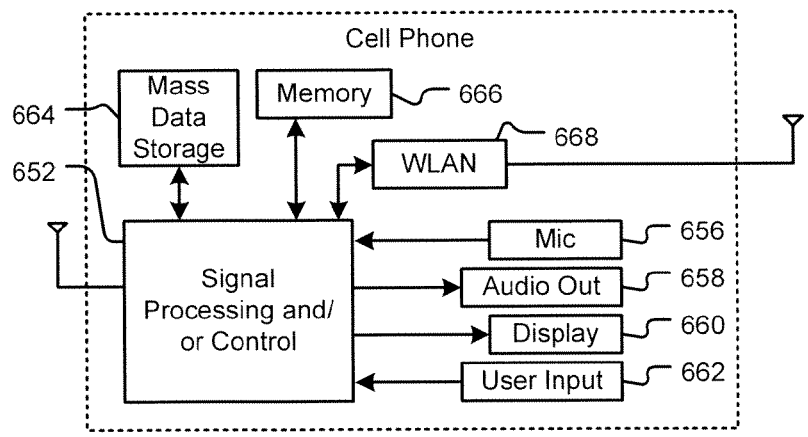
FIG. 12D is a block diagram of a cellular phone that may utilize the hard disk controller and the read/write channel device of FIG. 5.

Referring now to FIG. 12D, the techniques may be utilized in a cellular phone 650 that may include a cellular antenna 651. The cellular phone 650 includes signal processing and/or control circuits, which are generally identified in FIG. 12D at 652, a WLAN interface 668, and a mass data storage 664. The techniques may be utilized in the mass storage device 664, for example. In some implementations, cellular phone 650 includes a microphone 656, an audio output 658 such as a speaker and/or audio output jack, a display 660 and/or an input device 662 such as a keypad, pointing device, voice actuation and/or other input device. Signal processing and/or control circuits 652 and/or other circuits (not shown) in cellular phone 650 may process data, perform coding and/or encryption, perform calculations, format data and/or perform other cellular phone functions.

Cellular phone 650 may communicate with mass data storage 664 that stores data in a nonvolatile manner such as optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8". Cellular phone 650 may be connected to memory 666 such as RAM, ROM, low latency nonvolatile memory such as flash memory and/or other suitable electronic data storage. Cellular phone 650 also may support connections with a WLAN via a WLAN network interface 668.

Figure 12E:
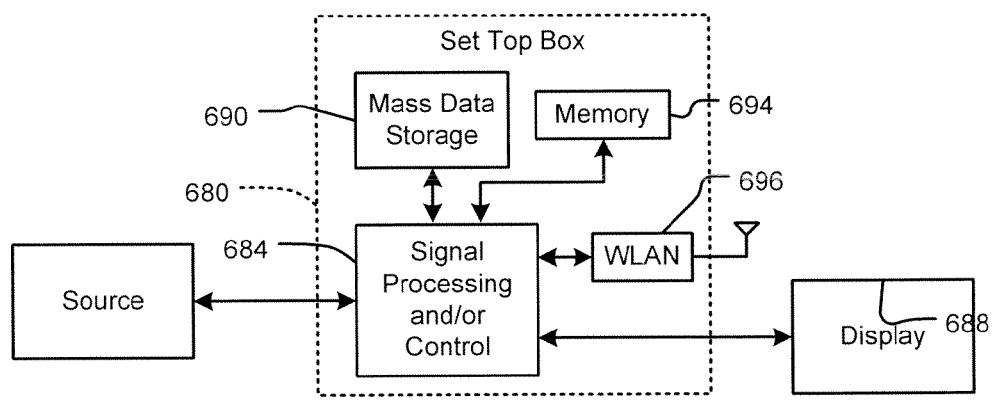
FIG. 12E is a block diagram of a set top box that may utilize the hard disk controller and the read/write channel device of FIG. 5.

Referring now to FIG. 12E, the techniques may be utilized in a set top box 680. The set top box 680 includes signal processing and/or control circuits, which are generally identified in FIG. 12E at 684, a WLAN interface 696, and a mass data storage device 690. The techniques may be utilized in the mass storage device 690, for example. Set top box 680 receives signals from a source such as a broadband source and outputs standard and/or high definition audio/video signals suitable for a display 688 such as a television and/or monitor and/or other video and/or audio output devices. Signal processing and/or control circuits 684 and/or other circuits (not shown) of the set top box 680 may process data, perform coding and/or encryption, perform calculations, format data and/or perform any other set top box function.

Set top box 680 may communicate with mass data storage 690 that stores data in a nonvolatile manner. Mass data storage 690 may include optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8". Set top box 680 may be connected to memory 694 such as RAM, ROM, low latency nonvolatile memory such as flash memory and/or other suitable electronic data storage. Set top box 680 also may support connections with a WLAN via a WLAN network interface 696.

Figure 12F:
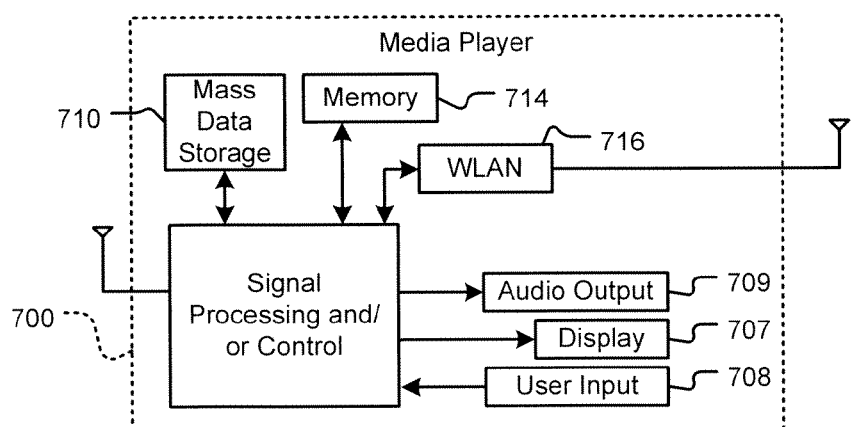
FIG. 12F is a block diagram of a media player that may utilize the hard disk controller and the read/write channel device of FIG. 5.

Referring now to FIG. 12F, the techniques may be utilized in a media player 700. The media player 700 may include signal processing and/or control circuits, which are generally identified in FIG. 12F at 704, a WLAN interface 716, and a mass data storage device 710. The techniques may be utilized in the mass storage device 710, for example. In some implementations, media player 700 includes a display 707 and/or a user input 708 such as a keypad, touchpad and the like. In some implementations, media player 700 may employ a graphical user interface (GUI) that typically employs menus, drop down menus, icons and/or a point-and-click interface via display 707 and/or user input 708. Media player 700 further includes an audio output 709 such as a speaker and/or audio output jack. Signal processing and/or control circuits 704 and/or other circuits (not shown) of media player 700 may process data, perform coding and/or encryption, perform calculations, format data and/or perform any other media player function.

Media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8". Media player 700 may be connected to memory 714 such as RAM, ROM, low latency nonvolatile memory such as flash memory and/or other suitable electronic data storage. Media player 700 also may support connections with a WLAN via a WLAN network interface 716. Still other implementations in addition to those described above are contemplated.

Figure 12G:
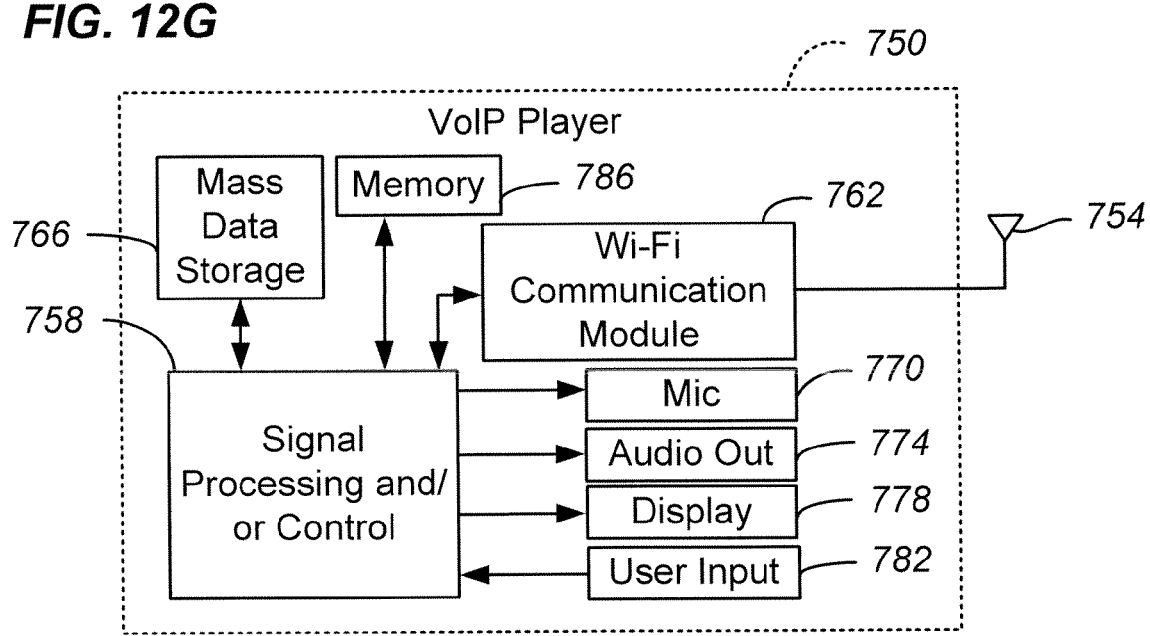
FIG. 12G is a block diagram of a voice over IP device that may utilize the hard disk controller and the read/write channel device of FIG. 5.

Referring to FIG. 12G, the techniques may be utilized in a Voice over Internet Protocol (VoIP) phone 750 that may include an antenna 754, signal processing and/or control circuits 758, a wireless interface 762, and a mass data storage 766. The techniques may be utilized in the mass storage device 766, for example. In some implementations, VoIP phone 750 includes, in part, a microphone 770, an audio output 774 such as a speaker and/or audio output jack, a display monitor 778, an input device 782 such as a keypad, pointing device, voice actuation and/or other input devices, and a Wireless Fidelity (Wi-Fi) communication module 762. Signal processing and/or control circuits 758 and/or other circuits (not shown) in VoIP phone 750 may process data, perform coding and/or encryption, perform calculations, format data and/or perform other VoIP phone functions.

VoIP phone 750 may communicate with mass data storage 766 that stores data in a nonvolatile manner such as optical and/or magnetic storage devices, for example hard disk drives HDD and/or DVDs. At least one HDD may have the configuration shown in FIG. 12A and/or at least one DVD may have the configuration shown in FIG. 12B. The HDD may be a mini HDD that includes one or more platters having a diameter that is smaller than approximately 1.8". VoIP phone 750 may be connected to memory 786, which may be a RAM, ROM, low latency nonvolatile memory such as flash memory and/or other suitable electronic data storage. VoIP phone 750 is configured to establish communications link with a VoIP network (not shown) via Wi-Fi communication module 762.

The various method blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, the Internet, etc. (which are viewed as being the same as or interchangeable with providing such software via a transportable storage medium). When implemented in hardware, the hardware may comprise one or more of discrete components, an integrated circuits, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for causing data to be written to a non volatile medium, the method comprising:
   transmitting, to a write or read/write channel device, first data to be encoded and written in a sector of the non-volatile medium as a first codeword;
   transmitting to the write or read/write channel device an indication of a size of a phase-locked loop synchronizing field to be written in the sector;
   asserting a write gate signal corresponding to the sector, wherein asserting the write gate signal indicates to the write or read/write channel device when to write the first codeword to the sector; and
   while asserting the write gate signal to cause the first codeword to be written, transmitting, to the write or read/write channel device, second data to be encoded and written to the non-volatile medium.

2. A method as defined in claim 1, further comprising: receiving an indication of a codeword size; and
   utilizing the codeword size to pre-fill data units of the first data to be encoded and written in the sector as the first codeword prior to transmitting the first data to be encoded and written in the sector as the first codeword.

3. A method as defined in claim 2, further comprising:
   receiving an indication of a number of parity bits in the first codeword; and
   utilizing the number of parity bits to pre-fill data units of the first data to be encoded and written in the sector as the first codeword prior to transmitting the first data to be encoded and written in the sector as the first codeword.

4. A method as defined in claim 1, further comprising transmitting to the write or read/write channel device an indication of one fragment of a plurality of fragments of the sector when a portion of the first codeword is to be written to the one fragment.

5. A method as defined in claim 1, further comprising transmitting to the write or read/write channel device an indication of a size of the sector or a fragment of the sector.

6. A non volatile medium controller to control a write or read/write channel device, the non volatile medium controller comprising:
   a write data bus generation circuit, the write data bus generation circuit to transmit data units corresponding to a first codeword to be written in a write sector, wherein the write sector is a sector of a non volatile medium to which the first codeword is to be written;
   a phase-locked loop (PLL) synchronizing field size indicator signal generation circuit to generate a PLL synchronizing field size indicator signal, the PLL synchronizing field size indicator signal indicating a size of a PLL synchronizing field to be written to the sector before at least a portion of the first codeword;
   a write gate signal generation circuit configured to generate a write gate signal, the write gate signal, when asserted, indicating when the first codeword is to be written to the write sector;
   wherein the non-volatile medium controller is configured to cause the write data bus generation circuit to transmit, on the write data bus, data units corresponding to a second codeword while the write gate signal is asserted for writing the first codeword to the write sector.

7. A non volatile medium controller as defined in claim 6, further comprising a pre-filling logic circuit to append one or more bits set to a predetermined value to data units corresponding to the first codeword.

8. A non volatile medium controller as defined in claim 7, further comprising a codeword size reception circuit coupled to the pre-filling logic circuit, the codeword size reception circuit to receive an indicator of a size of the first codeword and to provide the indicator of a size of the first codeword to the pre-filling logic circuit.

9. A non volatile medium controller as defined in claim 8, further comprising a parity information bus reception circuit coupled to the pre-filling logic circuit, the parity information bus reception circuit to receive an indicator of a number of parity bits in the first codeword and to provide the indicator of the number of parity bits in the first codeword to the pre-filling logic circuit.

10. A non volatile medium controller as defined in claim 6, further comprising a write fragment indicator signal generation circuit to generate a write fragment indicator signal, the write fragment indicator signal to indicate which fragment of the write sector is to be written when the write gate signal is asserted.

11. A non volatile medium controller as defined in claim 6, wherein the write or read/write channel device is a read/write channel device, and wherein the non volatile medium controller further comprises:
   a read gate signal generation circuit configured to generate a read gate signal, the read gate signal, when asserted, indicating when a third codeword is to be read from a read sector, wherein the read sector is a sector of the non volatile medium from which the third codeword is to be read; and a read data bus reception circuit to receive data units corresponding to the third codeword;

wherein the non-volatile medium controller is configured to cause the read gate signal generation circuit to assert the read gate signal to read a fourth codeword from the non-volatile medium while the read data bus reception circuit receives the data units corresponding to the third codeword.

12. A non volatile medium controller as defined in claim 6, further comprising a sector size indicator generation circuit to transmit an indication of a size of the write sector or a fragment of the write sector.

13. A method for causing data to be written to a non volatile medium, the method comprising:
  receiving first data to be encoded and written in a sector of the non volatile medium as a first codeword;
  receiving an indication of a size of a phase-locked loop (PLL) synchronizing field to be written in the sector or a fragment of the sector;
  encoding the first data to generate the first codeword;
  writing to the sector or the fragment of the sector the PLL synchronizing field having the size indicated by the indication of the size of the PLL synchronizing field;
  if the sector is a split sector, asserting a non volatile medium write signal to write a portion of the first codeword to a fragment of the sector; and
  if the sector is not a split sector, asserting the non volatile medium write signal to write the first codeword to the sector.

14. A method as defined in claim 13, further comprising receiving second data to be encoded and written as a second codeword to the non volatile medium while asserting the non volatile medium write signal to write at least the portion of the first codeword to the sector.

15. A method as defined in claim 13, further comprising receiving a write gate signal corresponding to the sector or the fragment of the sector.

16. A method as defined in claim 13, further comprising transmitting to a non volatile medium controller an indication of a size of the first codeword to be written in the sector.

17. A method as defined in claim 13, further comprising, if the sector is a split sector, receiving an indication of the fragment, from a plurality of fragments of the sector, to which the portion of the first codeword is to be written.

18. A method as defined in claim 13, further comprising receiving an indication of a size of the sector or the fragment of the sector.

19. A write or read/write channel device, comprising:
  a write data bus reception circuit to receive first data units via a write data bus;
  an encoder to generate a first codeword based on the first data units received via the write data bus;
  a phase-locked loop (PLL) synchronizing field size indicator signal reception circuit to receive a PLL synchronizing field size indicator signal;
  a write gate signal reception circuit to receive a write gate signal;
  a non volatile medium write signal generator circuit to generate a non volatile medium write signal to write at least a portion of the first codeword to the non-volatile medium at a position indicated by the write gate signal; and
  wherein the non volatile medium write signal generator circuit is configured to generate the non volatile medium write signal to write to the non-volatile medium a PLL synchronizing field having a length indicated by the PLL synchronizing field size indicator signal.

20. A write or read/write channel device as defined in claim 19, wherein the write or read/write channel device is configured to receive second data to be encoded and written as a second codeword while the non volatile medium write signal generator circuit generates the non volatile medium write signal to write the at least the portion of the first codeword to the non volatile medium.

21. A write or read/write channel device as defined in claim 19, further comprising a write fragment indicator signal reception circuit to receive a write fragment indicator signal that indicates which fragment of the sector is to be written when the write gate signal is asserted.

22. A write or read/write channel device as defined in claim 19, further comprising:
  a read gate signal reception circuit; and
  a non volatile medium read signal reception circuit to receive a non volatile medium read signal and to generate at least a portion of a third codeword stored on the non-volatile medium based on the non volatile medium read signal and in response to the read gate signal;
  a decoder to decode the third codeword; and
  a read data bus generation circuit to transmit data units corresponding to the third codeword;
  wherein the write or read/write channel device is configured to cause the non volatile medium read signal reception circuit to generate at least a portion of a fourth codeword stored on the non-volatile medium while the read data bus generation circuit transmits the data units corresponding to the third codeword.

23. A write or read/write channel device as defined in claim 19, further comprising a sector or sector fragment size indicator bus reception circuit to receive an indication of a size of a sector or sector fragment on the non-volatile medium to which at least a portion of the first codeword is to be written.

* * * * *